United States Patent
Mitura

(10) Patent No.: US 11,176,373 B1
(45) Date of Patent: Nov. 16, 2021

(54) SYSTEM AND METHOD FOR VISITOR DETECTION ALGORITHM

(71) Applicant: AMAZON TECHNOLOGIES, INC., Seattle, WA (US)

(72) Inventor: Michael Jason Mitura, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 16/246,415

(22) Filed: Jan. 11, 2019

Related U.S. Application Data

(60) Provisional application No. 62/616,993, filed on Jan. 12, 2018.

(51) Int. Cl.
*G06K 9/00* (2006.01)
*G06F 16/583* (2019.01)

(52) U.S. Cl.
CPC ....... *G06K 9/00671* (2013.01); *G06F 16/583* (2019.01); *G06K 9/00288* (2013.01); *G06K 9/00771* (2013.01)

(58) Field of Classification Search
CPC ........... G06K 9/00671; G06K 9/00771; G06K 9/00288; G06F 16/58
See application file for complete search history.

(56) References Cited

U.S. PATENT DOCUMENTS

| | | | |
|---|---|---|---|
| 4,764,953 A | 8/1988 | Chern et al. | |
| 5,428,388 A | 6/1995 | Von Bauer et al. | |
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Bobbak Safaipour
(74) *Attorney, Agent, or Firm* — Lathrop GPM LLP

(57) ABSTRACT

A system and visitor recognition method receives a first image of a detected visitor at a first location, compares the image of the detected visitor to a prior visitor model including images of prior visitors to the first location or a second location. In some embodiments, when an image of the detected visitor matches the images of the prior visitor captured at a time differing from the capture time of the image of the detected visitor, the detected visitor is determined as unknown. In some embodiments, when the image of the detected visitor matches a group of images of a prior visitor at the second location, and the number of times the prior visitor was previously detected at the second location is above a second threshold, the detected visitor is determined as known, even if the detected visitor was not detected at the first location at least a threshold number of times.

21 Claims, 11 Drawing Sheets

(56) References Cited

U.S. PATENT DOCUMENTS

| | | |
|---|---|---|
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,583,294 B2 * | 9/2009 | Ray .................... G06K 9/00234 348/222.1 |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 * | 8/2015 | Scalisi ................ H04M 11/025 |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 * | 11/2015 | Scalisi ................ H04M 11/025 |
| 9,230,424 B1 | 1/2016 | Scalisi et al. |
| 9,235,943 B2 * | 1/2016 | Scalisi ................ G06K 9/00288 |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,584,775 B2 * | 2/2017 | Siminoff ............. H04M 11/025 |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,830,790 B2 * | 11/2017 | Jones ............... G08B 13/19617 |
| 9,892,311 B2 * | 2/2018 | Kusens .................... G06T 7/20 |
| 9,978,238 B2 * | 5/2018 | Fadell .................. G08B 19/005 |
| 10,152,636 B2 * | 12/2018 | Greenberger ........... G06T 11/60 |
| 10,777,055 B1 * | 9/2020 | Star ................. G08B 13/19613 |
| 10,789,820 B1 * | 9/2020 | Jones .................... G08B 15/00 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0290789 A1 * | 12/2007 | Segev ................. E05B 47/0657 340/5.6 |
| 2008/0247609 A1 * | 10/2008 | Feris .................. G06K 9/00369 382/118 |
| 2011/0292232 A1 * | 12/2011 | Zhang .................. G06F 16/583 348/222.1 |
| 2013/0057695 A1 | 3/2013 | Huisking |
| 2014/0015967 A1 * | 1/2014 | Moore ............... H04N 5/23219 348/143 |
| 2015/0035987 A1 | 2/2015 | Fernandez |
| 2015/0116210 A1 * | 4/2015 | Chang ..................... G06F 3/017 345/156 |
| 2017/0046735 A1 * | 2/2017 | Koh .................... G06Q 30/0254 |
| 2017/0337602 A1 * | 11/2017 | Davis ................... G06Q 30/0607 |
| 2017/0373877 A1 * | 12/2017 | Scalisi ................ H04L 12/2825 |
| 2018/0167394 A1 * | 6/2018 | High ..................... H04L 63/123 |
| 2018/0285655 A1 * | 10/2018 | Liu ..................... G06K 9/00778 |
| 2018/0288373 A1 * | 10/2018 | Hwang .............. G06K 9/00288 |
| 2018/0350213 A1 * | 12/2018 | Bart ........................ G08B 13/19 |
| 2019/0089934 A1 * | 3/2019 | Goulden .......... G08B 13/19684 |
| 2019/0392691 A1 * | 12/2019 | Cheng ............. G08B 13/19671 |
| 2020/0051095 A1 * | 2/2020 | Kumar ............... G06Q 30/0201 |
| 2020/0151977 A1 * | 5/2020 | Vos ......................... G07C 9/25 |
| 2020/0382333 A1 * | 12/2020 | Scalisi ................ H04L 12/2825 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

* cited by examiner

SYSTEM AND METHOD FOR VISITOR DETECTION ALGORITHM

CROSS-REFERENCE TO RELATED APPLICATION

This application benefits from and claims priority to U.S. Provisional Application Ser. No. 62/616,993, filed on Jan. 12, 2018. The aforementioned application is incorporated by reference in its entirely herein.

TECHNICAL FIELD

The present embodiments pertain to audio/video (A/V) recording and communication devices, including A/V recording and communication doorbells, security cameras, and floodlight controllers. Certain of the present embodiments further pertain to premises security systems.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as video doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a video doorbell unit at the entrance to the home, acts as a powerful deterrent against would-be burglars.

DETAILED DESCRIPTION OF THE EMBODIMENTS

Figure 1:
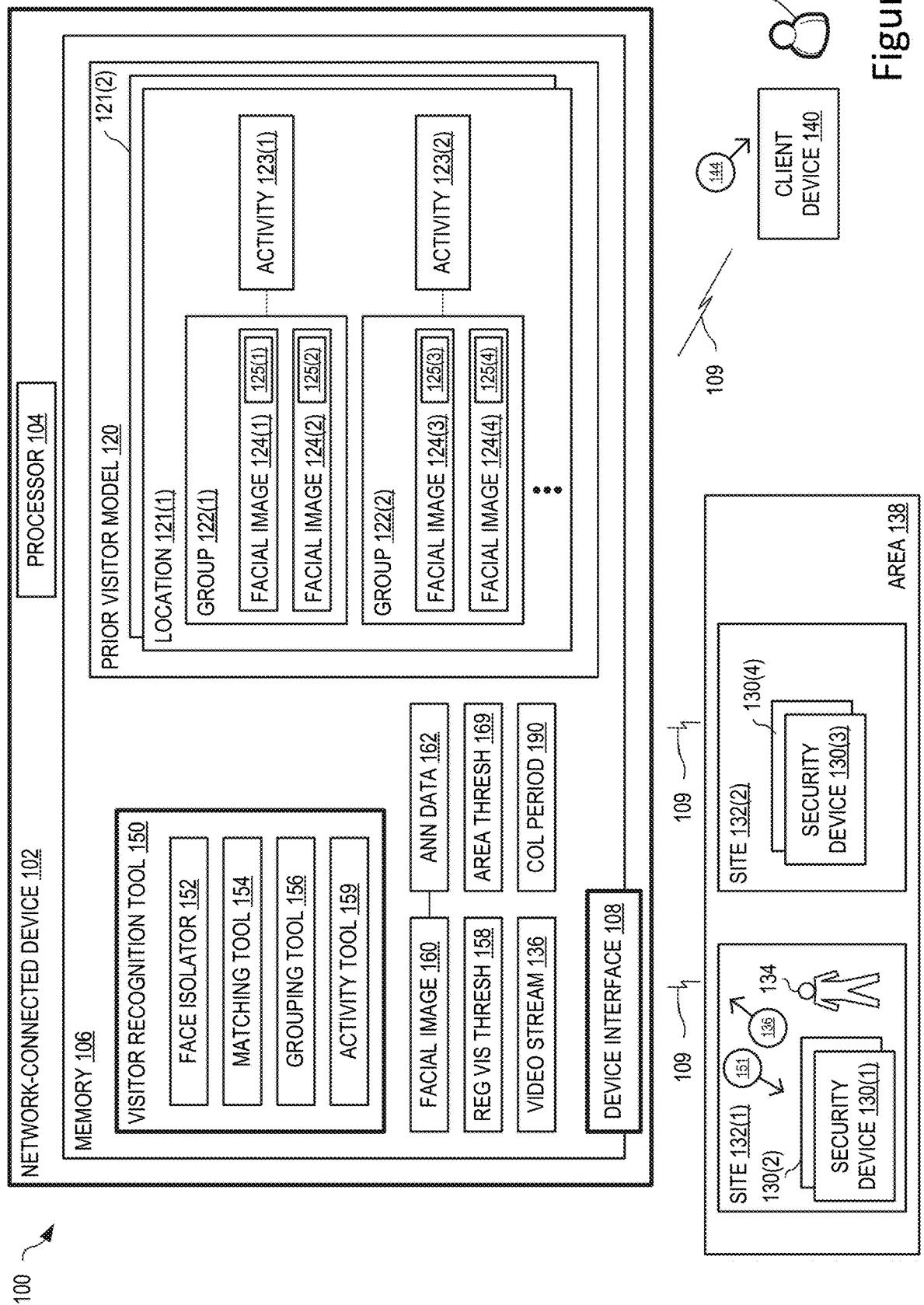
FIG. 1 is a functional block diagram illustrating one example system for recognizing visitors, in an embodiment.

The following detailed description describes the present embodiments with reference to the drawings. In the drawings, reference numbers label elements of the present embodiments. These reference numbers are reproduced below in connection with the discussion of the corresponding drawing features.

Some security devices detect a visitor within a monitored environment and then notify a user of that detected visitor. These security devices do not distinguish between frequently detected visitors and infrequently detected visitors, and therefore generate many unneeded notifications when frequently detected visitors are detected. For example, a security device at a residence may generate many unneeded notifications when occupants of the residence (e.g., family members that are expected to be at the residence) are detected. Accordingly, one aspect of the present embodiments includes the realization that a security device at a site frequently generates unneeded, and likely unwanted, notifications when triggered by detected visitors, within the field of view of the security device, who are not unexpected at the site. The present embodiments solve this problem by distinguishing between expected events and unexpected events based one whether a detected object (e.g., a person/visitor) is recognized or not. Advantageously, this process of recognizing objects within the field of view of the security device further enables a security system to reduce the number of generated false notifications.

Another aspect of the present embodiments includes the realization that when a person receives too many notifications that are not of interest, the person stops taking notice of all notifications, even the ones of interest (a phenomenon known as alert fatigue). The present embodiments solve this problem by reducing the number of unneeded notifications sent from a security system, thereby allowing the user to receive mostly notifications of interest, and reducing the incidence of alert fatigue.

A security device, such as a video doorbell, floodlight camera, and so on, may be configured to monitor an environment at a property using a video camera (and, in some embodiments, a separate motion detector). The security device captures images (and sounds) of visitors to the property, as well as other objects such as vehicles, pets, etc., as they pass through the monitored environment. These captured images may be processed to learn which of the visitors and/or other objects are regular visitors to the property, so that regular visitors may be treated as known visitors to the system (with some exceptions), while a new visitor may be treated as potentially unknown. Similarly, a new visitor at a first property, who is a frequent visitor at a neighboring house to the first property (e.g., a neighbor living there) might also visit the first property on occasion, without being considered unknown.

Under certain circumstances, a person that is a frequent visitor to the first property may still be considered unknown when the circumstances of a particular visit are unusual, such as visiting at a different time than usual. For example, where a worker at a property comes and goes during the day to service the lawn or the pool, it would be unexpected to the system if that person appeared at night, and thus the worker would be considered unknown.

One aspect of the present embodiments includes the realization that security devices generate motion alerts without distinguishing between motion caused by known visitors and motion caused by unknown visitors. Security devices, therefore, frequently generate unneeded, and likely unwanted, notifications when triggered by people that are expected to be at the site. To solve this problem, the present embodiments distinguish between known events (e.g., expected detection of visitors and/or other objects) and unknown events (e.g., unexpected detection of visitors and/or other objects), at least in part by recognizing known visitors (e.g., frequent visitors) and/or other objects. Advantageously, this process of recognizing visitors and/or other objects that are expected to be detected by a security system further enables the security system to reduce the number of false notifications that are generated, since the present embodiments also include the realization that when a person receives too many notifications that are not of interest, the person stops taking notice of nearly all notifications, even the ones that should be of interest (a phenomenon known as alert fatigue). By reducing the number of unneeded notifications sent from a security system, the user is not swamped by unneeded and less useful notifications and may instead focus on notifications of interest.

Figure 4:
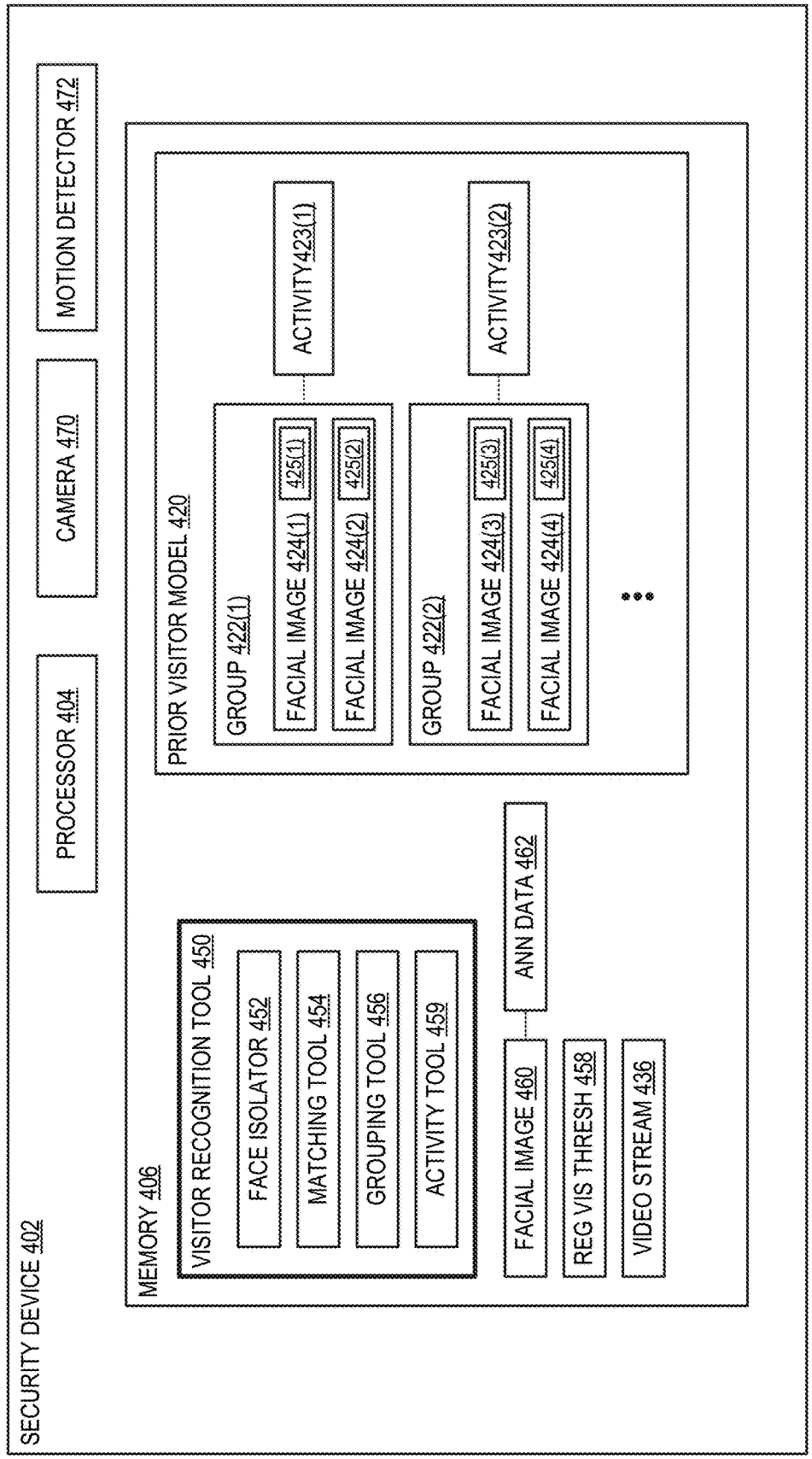
FIG. 4 is a functional block diagram illustrating one example security device that automatically determines whether a visitor is new, in an embodiment.

FIG. 1 is a functional block diagram illustrating one system 100 for recognizing visitors, according to various aspects of present disclosure. The system 100 may include at least one security device 130 configured to monitor an environment (e.g., a front entrance) of a first site 132(1) (e.g., a residential home, an office, a workshop, and so on), and a network-connected device 102 (e.g., a cloud-based server, a home automation hub, a premises security hub, and so on) that is in communication with the first security device 130(1). The first site 132(1) may also be configured with one or more additional security devices 130 (e.g., a second security device 130(2)) that may monitor a different part of the first site 132(1). The example of FIG. 1 also shows a second site 132(2) configured with two security devices 130(3) and 130(4). However, each site 132(1) and 132(2) may have fewer or more security devices 130 without departing from the scope of the embodiments described herein. Any of the security devices 130 may include functionality of the audio/video recording and communication device 500 of FIG. 5. The network-connected device 102 has a processor 104 communicatively coupled with a memory 106, which stores machine readable instructions that, when executed by the processor 104, control the functionality described herein. In certain embodiments, the network-connected device 102 is located at the site 132(1), such as where the network-connected device 102 is implemented as a communicatively connected automation hub (e.g., a wireless and/or wired network implemented by one or more communication protocols). In certain other embodiments, such as shown in FIG. 4, functionality of the network-connected device 102 may be implemented at least in part by a security device 402 that automatically recognizes a new visitor to the site 132(1).

The network-connected device 102 also includes a device interface 108, which has connecting circuitry and machine-readable instructions stored within the memory 106 that, when executed by the processor 104, operate the network-connected device 102 to receive video streams 136 from linked security devices 130 (e.g., any of the security devices 130(1)-(4)). For example, when a visitor 134 to the site 132(1) is detected, the first security device 130(1) sends a live video stream 136 to the network-connected device 102 via a network 109 and the device interface 108. Communication between the security device 130 and the device interface 108 may occur via the network 109, such as one or more of a local area network, a wide area network, the Internet, and a smart home network; alternatively, it may be hard wired. The network 109, for example, also connects with a client device 140 described below.

A visitor recognition tool 150 of the network-connected device 102 has machine-readable instructions stored within the memory 106 that, when executed by the processor 104, operate to recognize the visitor 134 and determine whether the visitor 134 is known to the system or not. Where the visitor 134 is recognized as someone that has visited the site 132(1) regularly, the visitor 134 is not considered as known. However, where the visitor 134 is not recognized as a regular visitor to the site 132(1), or where the visitor 134 is visiting or located in an area that is not normal for the visitor 134, the visitor 134 is considered as unknown.

Continuing with this example, where the visitor 134 is considered unknown, the network-connected device 102 may immediately notify a responsible party 142 by sending a notification 144 to the client device 140 associated with the first security device 130(1) that captured images of the unknown visitor 134 at the site 132(1). In an embodiment, the network-connected device 102 also increases a security level of the first security device 130(1) and/or other security devices 130: for example the second security device 130(2) co-located at the site 132(1) and/or the security devices 130(3) and 130(4) located within an area 138 (e.g., a neighborhood, an industrial area, a residential area, a town, a city, etc.) also containing or otherwise associated with the site 132(1). For example, where the area 138 is a neighborhood that contains the sites 132(1) and 132(2), when a visitor 134 to the site 132(1) is considered unknown, the network-connected device 102 may notify each client device 140 of members of the neighborhood (e.g., area 138) that there has been an unknown visitor 134, thereby increasing a security level of all security devices 130 within the area 138. Therefore, the messaging by the network-connected device 102 of the unknown event (the determination that a visitor 134 is unexpected at the site 132(1)) to client devices 140 corresponding to the area 138 may automatically increase security of the area 138.

In an embodiment, the network-connected device 102 includes a prior visitor model 120 that stores previously captured facial images 124 of visitors captured by any of the security devices 130, together with corresponding annotation data 125. However, in some embodiments, the facial images or annotation data are not associated with who the facial image belongs to. For example, for each of the facial images 124 captured by the first security device 130(1), the corresponding annotation data 125 may include at least one of the location of the first security device 130(1), a unique identifier (ID) of the first security device 130(1), a time the facial image was captured (e.g., a date and time stamp of when the corresponding video stream 136 was captured by the first security device 130(1) and/or when the corresponding video stream 136 was received by the network-connected device 102), and so on. Within the prior visitor model 120, the facial images 124 are collated into groups 122 of like faces for each of the locations 121(1) and 121(2) corresponding to the location of the security device 130 that captured the video stream 136. In the example of FIG. 1, the first location 121(1) corresponds to the first site 132(1), and the second location 121(2) corresponds to the second site 132(2). The location 121(1) is shown with groups 122(1)

and 122(2), and may have fewer or more groups 122 without departing from the scope hereof.

The visitor recognition tool 150 may include algorithms and tools, implemented as machine readable instructions that may be executed by the processor 104 when invoked. As shown in the example of FIG. 1, the visitor recognition tool 150 includes a face isolator 152, a matching tool 154, a grouping tool 156, and an activity tool 159. As described in further detail below, the visitor recognition tool 150 invokes the prior visitor model 120 when a newly captured facial image 160 is added to a corresponding one (new or existing) of the groups 122. In certain embodiments, the visitor recognition tool 150 invokes the prior visitor model 120 using the face isolator 152 and the grouping tool 156 to process a plurality of video clips of prior visitors captured by any of the security devices 130, isolating the faces of the prior visitors within each of the video clips, and grouping the isolated faces by likeness into one or more of the groups 122. The prior visitor model 120 includes facial images 124 that were captured during a collection period based upon a collection period length 190 (e.g., one week, two weeks, one month, three months, six months, one year, or any other length). The collection period may be a sliding window of time that ends at the present time, such that facial images 124 may be removed from the prior visitor model 120 when their corresponding capture timestamp indicates that they were not captured during the collection period.

In the following description, the location 121(1), the groups 122(1) and 122(2), and the facial images 124(1)-(4), are used by example; however, other locations (e.g., the location 121(2)), the groups, and the facial images may be similarly processed and evaluated. Continuing with the example, the facial images 124(1) and 124(2) within the group 122(1) are considered to be of the same person (e.g., the visitor 134) and to have visited the site 132(1) that corresponds to the location 121(1). Similarly, the facial images 124(3) and 124(4) within the group 122(2) are considered to be of the same person (e.g., a person other than the visitor 134) and to have also visited the site 132(1). When the group 122(1) contains many facial images 124, the visitor 134 is considered to regularly visit the site 132(1). When the group 122(1) contains few facial images 124, the visitor 134 is considered not to regularly visit the site 132.

In various embodiments, a determination of whether the group 122(1) contains many facial images or few facial images may comprise comparing the actual number of facial images 124 in the group 122(1) with a threshold value. If the actual number of facial images 124 in the group 122(1) is greater than the threshold value, then the group 122(1) contains many facial images, while if the actual number of facial images 124 in the group 122(1) is less than or equal to the threshold value, then the group 122(1) contains few facial images. In one embodiment, the threshold value may be equal to four, while in other embodiments the threshold value may be equal to one, or two, or three, or five, or any other value.

In one embodiment, each of the groups 122(1) and 122(2) may correspond to specific periods, such as one or more of daytime (e.g., between 7:00 AM and 5:00 PM), nighttime (e.g., between 5:00 PM and 7:00 AM), morning (e.g., between 7:00 AM and noon), and afternoon (e.g., between noon and 5:00 PM). That is, the facial images 124(1) and 124(2) may be grouped based upon a time of day that the facial image is captured. The groups 122 may also correspond to calendar periods, such as one or more of workdays (e.g., Monday to Friday), weekends (e.g., Saturday and Sunday), seasons (e.g., spring, summer, winter, and fall), holidays, and so on.

In one example of operation, the visitor 134 is detected by the first security device 130(1) at the site 132(1), and the first security device 130(1) sends a video stream 136 to the network-connected device 102. To determine whether the visitor 134 is considered regular (or known) to the site 132(1), the visitor recognition tool 150 invokes the face isolator 152 to process the video stream 136 and generate a facial image 160 (or multiple facial images 160 if more than one visitor 134 is captured within the video stream 136) of an isolated face of the visitor 134 with the corresponding annotation data 162 (e.g., time of capture, location, security device ID, and so on). In one embodiment, the facial image 160 may contain only the face portion of the visitor 134 that is extracted from the images of the video stream 136. The face isolator 152 may use one or more algorithms to find and isolate a face within one or more images of the video stream 136. In some embodiments, the face of the visitor 134 is not specifically identified as belonging to a named person and the prior visitor model 120 does not associate any of the groups 122(1)-(2) with named individuals.

The visitor recognition tool 150 may select the location 121(1) based upon the annotation data 162. For example, the annotation data 162 may indicate that the facial image 160 was determined from the video stream 136 received from the first security device 130(1), and accordingly, based upon the known location of the first security device 130(1), determine that the video stream 136 was captured at the first site 132(1) for association with the first location 121(1). The visitor recognition tool 150 invokes the matching tool 154 to attempt to match the facial image 160 and corresponding annotation data 162 to one of the groups 122(1)-(2) of the location 121(1) to determine whether the visitor 134 has previously visited the site 132(1). The matching tool 154 may compare the facial image 160 to at least one of the facial images 124 of each group 122(1) and 122(2). If the matching tool 154 determines that the facial image 160 matches at least one of the facial images 124(1) and 124(2) of the groups 122(1) and determines that a count of the facial images 124 within the matched group 122(1) is greater than a regular visitor threshold 158 (e.g., four), the visitor recognition tool 150 determines that the visitor is known (e.g., not unexpected at that location) to the system 100. When the facial image 160 is not matched to any of the groups 122(1)-(2), or when the count of the facial images 124 within the matched group 122(1) is equal to, or less than, the regular visitor threshold 158, then the visitor 134 is considered to be unknown (e.g., unexpected at that location) to the system 100. Thus, in this example, only when the visitor 134 has previously visited the site 132(1) at least five times, will the visitor 134 be considered a regular visitor and known to the system 100. The regular visitor threshold 158 may be set by the responsible party 142 by control of the client device 140, in an embodiment.

The visitor recognition tool 150 may invoke the grouping tool 156 to add the facial image 160 to the matched group 122(1), or to create a new group when no match is found, such that the prior visitor model 120 learns of each visitor and can thereby determine when the visitor 134 is regularly at the site 132. For example, where the facial image 160 is matched to the group 122(1), the grouping tool 156 adds the facial image 160 to the group 122(1), thereby increasing the count of facial images 124 within the group 122(1) by one. Where a family of four lives at the site 132(1), the first security device 130(1) frequently captures video streams 136 containing the family members, either singularly or collectively (e.g., where the face isolator 152 isolates multiple facial images 160 from the video stream 136 and the matching tool 154 matches each of these facial images to a different one of the groups 122 of the location 121(1) within the prior visitor model 120). Since the grouping tool 156 adds the facial image 160 to the corresponding group 122 within the location 121(1), the groups 122 corresponding to the family members quickly accumulate facial images 124 in excess of the regular visitor threshold 158. Accordingly, the visitor recognition tool 150 quickly learns to recognize the family members as known to the system 100 when they are captured in subsequent video streams 136 from the security devices 130(1) and 130(2).

In some embodiments, the matching tool 154 may search within one or more of the groups 122(1)-(2) corresponding to the capture time (e.g., within the annotation data 162) of the facial image 160. Thus, where the visitor is captured during a period outside their normal visiting times, there is no matching group 122 and the visitor is considered unknown to the system 100.

In an alternative embodiment, the prior visitor model 120 uses the activity tool 159 to determine activity 123 of visitors to the site 132. For example, the activity tool 159 analyzes the corresponding annotation data 125(1)-(2) for each facial image 124(1)-(2) within the group 122(1) to determine an activity 123(1) of the visitor at the site 132(1). For example, for the group 122(1), the activity 123(1) may define when the visitor 134 was previously captured at the site 132(1). The activity 123(1) enables the visitor recognition tool 150 to determine when the visitor 134 to the site 132(1) has arrived outside regular visiting times, for example. In another example, a worker working on a project at the site 132(1) may be frequently captured by the first security device 130(1) during normal working hours (e.g., 9:00 AM through 5:00 PM), thus forming the group 122(2) with an activity 123(2) indicative of the worker visiting only during working hours. When the system 100 matches the facial image 160 from the video stream 136 captured by the first security device 130(1) at 2:30 AM to one or more of the facial images 124(3) and 124(4) within the group 122(2), the visitor recognition tool 150 may use the activity 123(2) to determine that the visitor is unknown, since, although regular at the site 132(1), the visitor 134 has not conformed to previous activity.

In another example, a worker working on a project at the site 132(1) may be frequently captured by the first security device 130(1) located at a first location of the site 132(1) (e.g., the front yard). When the second security device 130(2) captures video of the worker located in the backyard of the site 132(1) and the system 100 determines that the facial image 160 from the video stream 136 captured by the second security device 130(2) was not previously identified in the facial images 124 of the second security device 130(2), but instead is matched to facial images 124 of the first security device 130(1), the visitor recognition tool 140 may use the activity 123 to determine the visitor is unknown, since, although regular at the site 132(1), the visitor 134 has not conformed to previous activity because the worker is now located in a new area of the site 132(1).

Within the prior visitor model 120, as discussed above, the facial images 124 may correspond to a collection period, such as one week, two weeks, three weeks, one month, two months, three months, one year, or any another period. The prior visitor model 120 uses facial images 124 collected during the collection period, wherein faces outside that period are removed from the prior visitor model 120. In some embodiments, the collection period may be a sliding window of time having the collection period length 190 ending at the present time, such that facial images 124 are removed from the prior visitor model 120 when they were not captured within the collection period. For example, the prior visitor model 120 may be based upon visitors to the site 132(1) during a collection period of the month ending at the current time. In another example, the prior visitor model 120 is based upon facial images 124 collected in the collection period of one week ending at the current time. In another example, the prior visitor model 120 is based upon facial images 124 collected in the collection period of one year ending at the current time. In one embodiment, the collection period length 190 may be defined for each site 132(1)-(2) based upon statistics and expected dynamics of visitors to the site. In an embodiment, the responsible party 142 may set the collection period length 190 via the client device 140.

Figure 2:
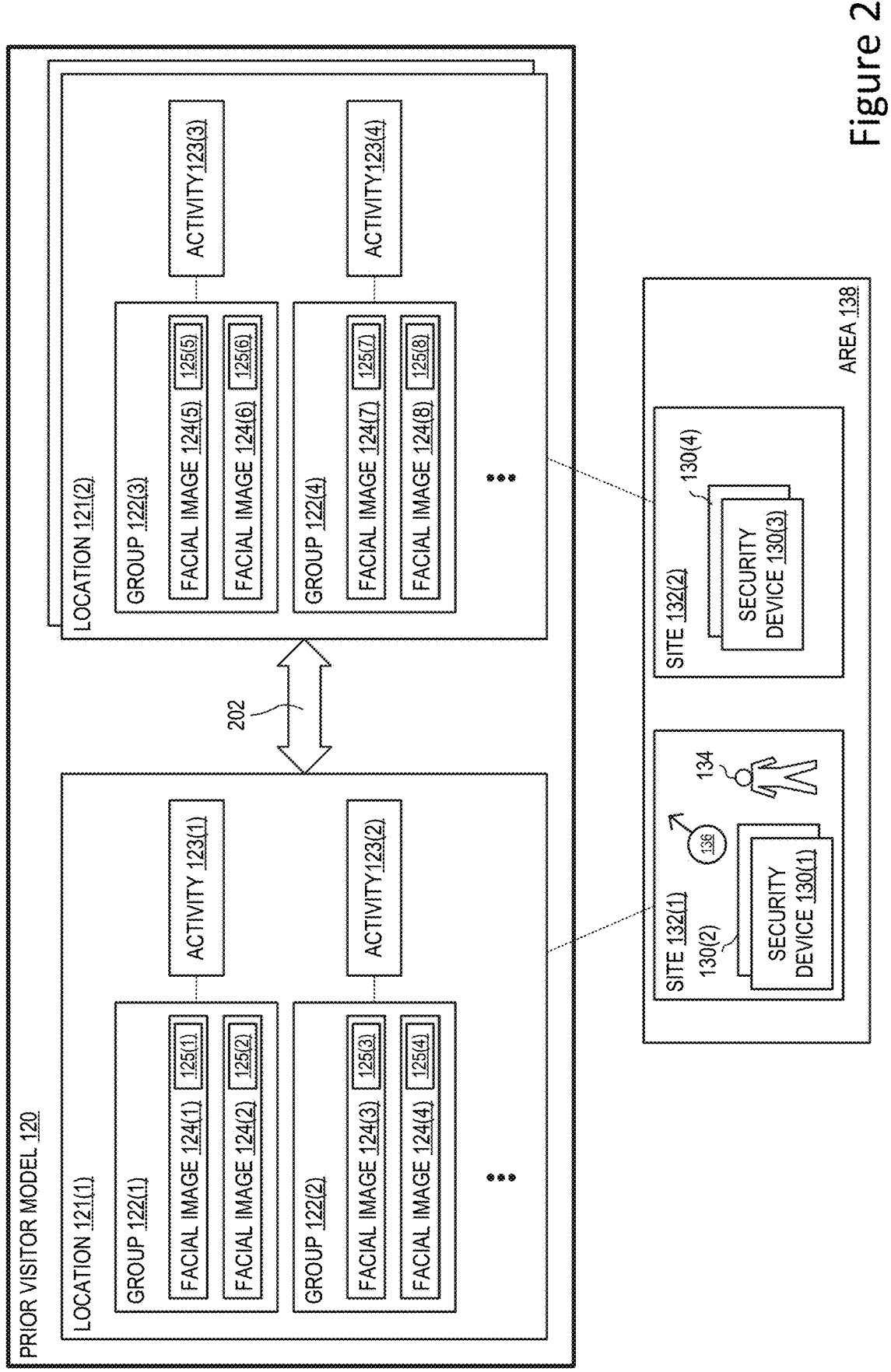
FIG. 2 is a functional block diagram illustrating the prior visitor model of FIG. 1, and further showing a relationship between two locations, in an embodiment.

FIG. 2 is a functional block diagram illustrating an embodiment of the prior visitor model 120 of FIG. 1 and showing further relationship between the locations 121(1) and 121(2) within the area 138. As described above, the first and second locations 121(1) and 121(2) correspond to the first and second sites 132(1) and 132(2), respectively. Where the sites 132(1) and 132(2) are residential properties, the area 138 may represent a neighborhood or residential subdivision, for example. Accordingly, the sites 132(1) and 132(2) have a geographic relationship to one another, which may be represented within the prior visitor model 120 as a relationship 202 that defines coordination between the locations 121(1) and 121(2).

Continuing with the example of FIGS. 1 and 2, the matching tool 154 may further compare the facial image 160 to facial images 124 of groups 122 of related locations 121. For example, the matching tool 154 may first compare the facial image 160 to facial images 124 of groups 122(1) and 122(2) of the first location 121(1), and, if no match is found, then compare the facial image 160 to facial images 124 of groups 122(3) and 122(4) of the related location 121(2), as defined by the relationship 202. Each of the locations 121(1) and 121(2) may have one or multiple relationships 202, or none at all, and the corresponding locations 121 are searched in turn until a match is found or there are no more related locations 121 left to search. The related locations 121 may be ordered, such that the matching tool 154 searches the most likely ones of the related locations 121 first for matches to the facial image 160. For example, the relationship 202 may define a distance between geographic locations of each of the sites 132 (1) and 132(2). In another example, the facial images 124 are first searched for a single household as the site 132(1), and the next most likely search is an adjacent household as the site 132(2).

The following example describes a situation where a neighbor of a first user may not be considered unknown when visiting the first user's home, whereas a visitor of the neighbor would be considered unknown when visiting the first user's home (assuming that the visitor of the neighbor is not also a regular visitor of the first user). This example includes an area threshold 169 (FIG. 1), which relates to the number of times a given person has been detected by one or more camera devices in the same area (e.g., neighborhood) as the first user's home, where the one or more camera devices are not located at the first user's home.

Thus, for example, a facial image of a neighbor of the first user might have a high detection count at the neighbor's house, and therefore would have a high area facial image count (e.g., above the area threshold 169), whereas a visitor to the neighbor's house would have a lower facial image count at the neighbor's house, and therefore would have a low area facial image count (e.g., below the area threshold 169). Therefore, when the neighbor visits the first user, in certain embodiments, the matching tool 154 may first compare the facial image count of the neighbor to the regular visitor threshold 158 (after comparing the neighbor's facial image to facial images previously observed by the camera devices at the first user's premises). If the neighbor's facial image count at the first user's premises is below the regular visitor threshold 158, the matching tool 154 may then compare the facial image count of the neighbor to the area threshold 169 (after comparing the neighbor's facial image to facial images previously observed by camera devices in the same area, but not located at the first user's premises). If the neighbor's facial image count is above the area threshold 169, which it likely would be, since the neighbor would have been observed numerous times by his or her own camera devices, then the process may conclude that the neighbor visiting the first user is known at the first site 132(1). By contrast, an occasional visitor of the neighbor, when visiting the first user, would likely have facial image counts below both the regular visitor threshold 158 and the area threshold 169, and would therefore be considered unknown at the first site 132(1) when visiting the first user's home (assuming that the visitor of the neighbor is not also a regular visitor of the first user).

In various embodiments, the value of the area threshold 169 may be greater (e.g., twenty) than the value of the regular visitor threshold 158. By having a higher value, the area threshold 169 may allow the visitor recognition tool 150 to distinguish whether the visitor to the first site 132(1) is a person that lives at the second site 132(2), or is a person that visits the second site 132(2) only occasionally. Accordingly, the visitor recognition tool 150 finds that the persons living at the second site 132(2) would not be considered unknown when visiting the first site 132(1), whereas a less frequent visitor to the second site 132(2) would still be considered unknown when visiting the first site 132(1).

Figure 3:
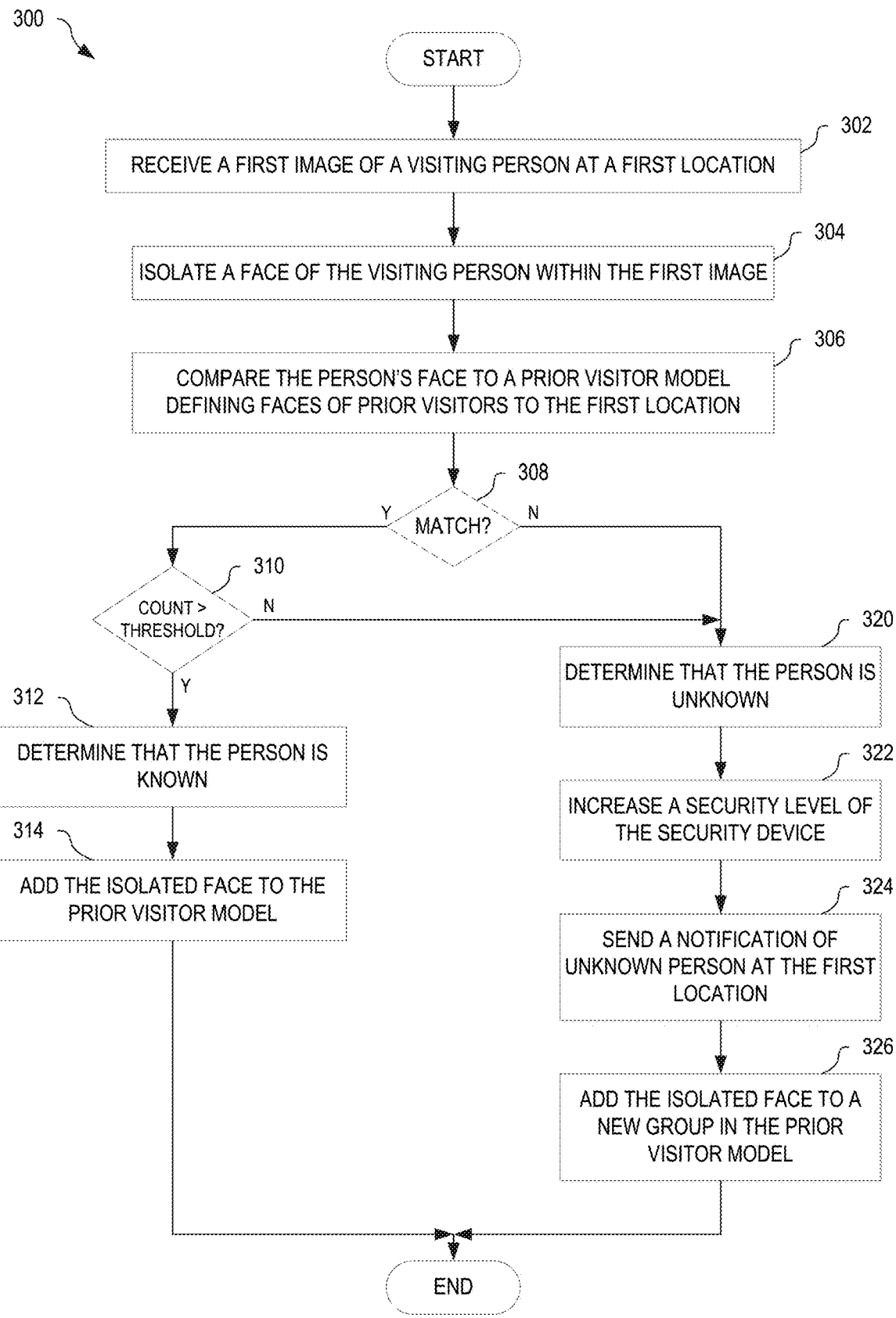
FIG. 3 is a flowchart illustrating one example method for recognizing visitors, in an embodiment.

FIG. 3 is a flowchart illustrating one example method 300 for recognizing visitors. The method 300 may be, for example, implemented, at least in part, within the visitor recognition tool 150 of the network-connected device 102 of FIG. 1.

In block 302, the method 300 receives a video stream from a security device located at a site. In one example of block 302, the network-connected device 102 receives the video stream 136 from the first security device 130(1) via the device interface 108. In block 304, the method 300 isolates a face of the visiting person within the first image. In one example of block 304, the visitor recognition tool 150 invokes the face isolator 152 to process the video stream 136 and generate one (or more) facial images 160 with corresponding annotation data 162.

In block 306, the method 300 compares the visiting person's face to a prior visitor model defining faces of prior visitors to the first location. In one example of block 306, the visitor recognition tool 150 invokes the matching tool 154 to match the facial image 160 to at least one facial image 124 of one group 122 associated with the location 121 and corresponding to the site 132(1). In a further example, where the matching tool 154 does not match the facial image 160 to a facial image 124 of groups 122 corresponding to the location 121(1), the matching tool 154 attempts to match the facial image 160 to at least one facial image 124 of one group 122 within the location 121(2) that is related to the location 121(1) (for example in the same neighborhood). In another example of block 306, the matching tool 154 matches the facial image 160 to at least one facial image 124 of one group 122 within the location 121 corresponding to the site 132(1) and then further matches the annotation data 162 to the activity 123 corresponding to the matched group 122 to determine whether the visitor 134 is known or not.

Block 308 is a decision. If, in block 308, the method 300 determines that the visiting person's face does not match any of the faces of prior visitors to the first location, the method continues with block 330; otherwise the method 300 continues with block 310.

Block 310 is a decision. If, in block 310, the method 300 determines that a count of facial images within the matched group is greater than a threshold, the method 300 continues with block 312; otherwise, the method 300 continues with block 320. In one example of block 310, the matching tool 154 determines a count of facial images 124 within the matched group 122 and compares it to the regular visitor threshold 158.

In block 312, the method 300 determines that the visiting person is known. In block 314, the method 300 adds the isolated face to the prior visitor model. In one example of block 314, the visitor recognition tool 150 invokes the grouping tool 156 to add the facial image 160 to the group 122(1). The method then terminates until another visitor is detected at one of the security devices 130(1)-(4).

In block 320, the method 300 determines that the visiting person is not known. In one example of block 320, the visitor recognition tool 150 determines that the visitor 134 is unknown.

In block 322, the method 300 increases a security level of the security device. In one example of block 322, the visitor recognition tool 150 sends an alert 151 to one or more of the security devices 130(1) and 130(2) located at the site 132(1) to increase a security level of the security devices 130(1) and 130(2) at the site. In block 324, the method 300 sends a notification of the unknown person at the first location. In one example of block 324, the visitor recognition tool 150 sends a notification 144 to the client device 140 associated with the first security device 130(1), the notification 144 indicating that there is an unknown person at the site 132(1). In block 326, the method 300 adds the isolated face to a new group in the prior visitor model. In one example of block 326, the visitor recognition tool 150 invokes the grouping tool 156 to create a new group 122 within the prior visitor model 120 and add the facial image 160, with the annotation data 162, to the new group 122 as facial image 124 and annotation data 125 for example. The method 300 then terminates until another visitor arrives at one of the security devices 130(1)-(4).

Advantageously, the use of the prior visitor model 120 and the visitor recognition tool 150 allows the network-connected device 102 to determine that the visitor 134 to the site 132(1) is unknown when they have not been a regular visitor to that site. Thus, a regular visitor may not trigger unnecessary notifications generated by the system 100.

FIG. 4 is a functional block diagram illustrating one example security device 402 that automatically determines whether a visitor is new. The security device 402 is similar to the security device 130 of FIG. 1, and yet includes the functionality of the network-connected device 102 described above. In particular, the security device 402 includes a processor 404 communicatively coupled with a memory 406. The security device 402 may also include functionality of the audio/video recording and communication device 500 of FIG. 5, to include a camera 470 and a motion detector 472, for example. The security device 402 also includes a visitor recognition tool 450, stored within the memory 406 as machine readable instructions that, when executed by the processor 404, operate to function as the visitor recognition tool 150 of FIG. 1. For example, the visitor recognition tool 450 includes a face isolator 452, a matching tool 454, a grouping tool 456, and an activity tool 459 that function similar to the face isolator 152, the matching tool 154, the grouping tool 156, and the activity tool 159, respectively, of the visitor recognition tool 150 of FIG. 1.

The visitor recognition tool 450 implements and uses a prior visitor model 420, stored within the memory 406, that includes groups 422 and corresponding activities 423 that are similar to the groups 122(1)-(4) and the activities 123 (1)-(4) of the prior visitor model 120, FIG. 1. However, in the embodiment of FIG. 4, the groups 422 contain only facial images 424(1)-(4), and associated annotation data 425(1)-(4), respectively, that were captured by the security device 402, and therefore relate only to the geographic location of the security device 402. The visitor recognition tool 450 invokes the matching tool 454 to determine whether a facial image 460, isolated within a video stream 436 from the camera 470 by the face isolator 452, matches one or more facial images 424 within any one group 422 of the prior visitor model 420. When a count of the facial images 424 within the matched group 422 is greater than a regular visitor threshold 458, the visitor recognition tool 450 determines that the visitor is known. In certain embodiments, where the security device 402 determines that the visitor captured within the video stream 436 is known, the security device 402 may suppress notification of presence of the visitor.

Audio/Video Recording and Communication Device

Figure 5:
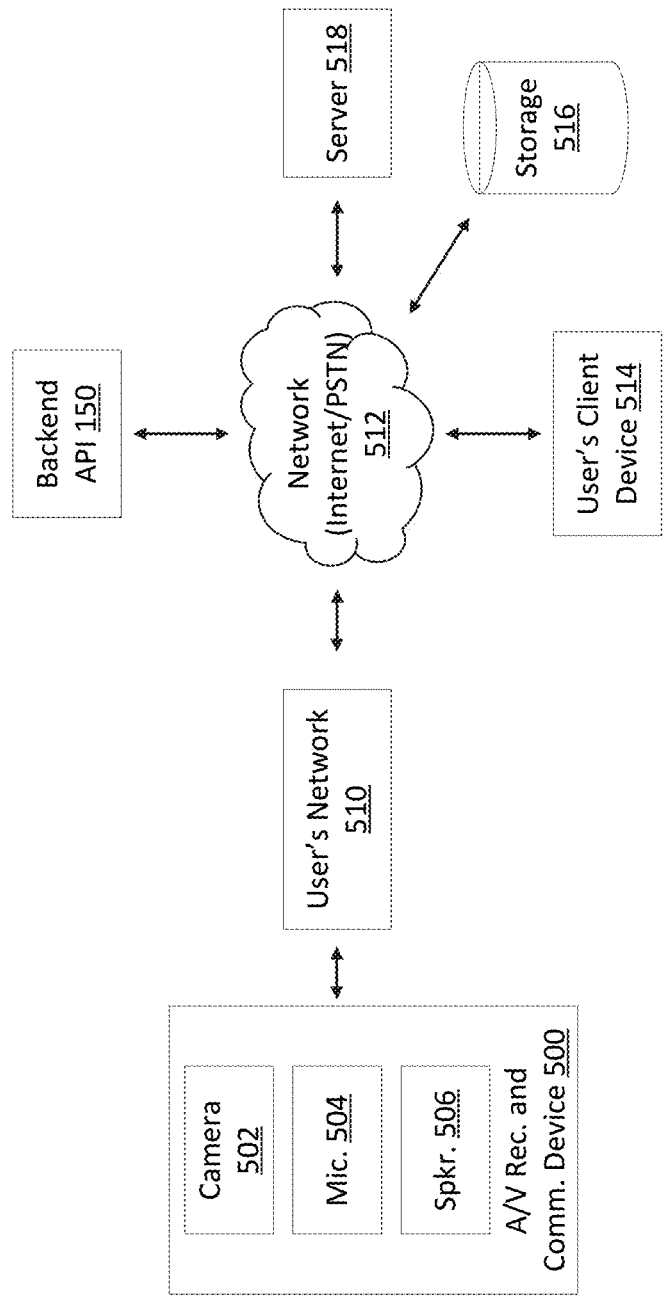
FIG. 5 is a functional block diagram illustrating a system for streaming and storing audio/video content captured by a device, according to an embodiment.

With reference to FIG. 5, the present embodiments include an audio/video recording and communication device 500, also known as a security device 500. While the present disclosure provides numerous examples of methods and systems including audio/video recording and communication doorbells, the present embodiments are equally applicable for audio/video recording and communication devices other than doorbells. For example, the present embodiments may include one or more audio/video recording and communication security cameras instead of, or in addition to, one or more audio/video recording and communication doorbells. An example audio/video recording and communication security camera may include substantially all of the structure and/or functionality of the doorbells described herein, but without a front button and related components.

The audio/video recording and communication device 500 may be located near the entrance to a structure (not shown), such as a dwelling, a business, a storage facility, etc. The audio/video recording and communication device 500 includes a camera 502, a microphone 504, and a speaker 506. The camera 502 may include, for example, a high definition (HD) video camera, such as one configured for capturing video images at an image display resolution of 720p, or 1080p, or better. While not shown, the audio/video recording and communication device 500 may also include other hardware and/or components, such as a housing, a communication module (which may facilitate wired and/or wireless communication with other devices), one or more motion sensors (and/or other types of sensors), a button, etc. The audio/video recording and communication device 500 may further include similar componentry and/or functionality as the wireless communication doorbells described in U.S. Pat. No. 9,584,775 and US Patent Publication Number 2015/0022618 (application Ser. No. 14/334,922), both of which are incorporated by reference herein in their entireties.

With further reference to FIG. 5, the audio/video recording and communication device 500 communicates with a user's network 510, which may be for example a wired and/or wireless network. If the user's network 510 is wireless, or includes a wireless component, the network 510 may be a Wi-Fi network compatible with the IEEE 802.11 standard and/or other wireless communication standard(s). The user's network 510 is connected to another network 512, which may comprise, for example, the Internet and/or a public switched telephone network (PSTN). As described below, the audio/video recording and communication device 500 may communicate with the user's client device 514 via the user's network 510 and the network 512 (Internet/PSTN). The user's client device 514 may comprise, for example, a mobile telephone (may also be referred to as a cellular telephone), such as a smartphone, a personal digital assistant (PDA), or another communication device. The user's client device 514 comprises a display (not shown) and related components configured for displaying streaming and/or recorded video images. The user's client device 514 may also comprise a speaker and related components configured for broadcasting streaming and/or recorded audio, and may also comprise a microphone. The audio/video recording and communication device 500 may also communicate with one or more remote storage device(s) 516 (may be referred to interchangeably as "cloud storage device(s)"), one or more servers 518, and/or a backend API (application programming interface) 520 via the user's network 510 and the network 512 (Internet/PSTN). While FIG. 5 illustrates the storage device 516, the server 518, and the backend API 520 as components separate from the network 512, it is to be understood that the storage device 516, the server 518, and/or the backend API 520 may be considered to be components of the network 512.

The network 512 may be any wireless network or any wired network, or a combination thereof, configured to operatively couple the above mentioned modules, devices, and systems as shown in FIG. 5. For example, the network 512 may include one or more of the following: a PSTN, the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network 512 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

In certain embodiments, when a person (may be referred to interchangeably as "visitor") arrives at the audio/video recording and communication device 500, the audio/video recording and communication device 500 detects the visitor's presence and begins capturing video images within a field of view of camera 502. The audio/video recording and communication device 500 may also capture audio through microphone 504. The audio/video recording and communication device 500 may detect the visitor's presence by detecting motion using the camera 502 and/or a motion sensor, and/or by detecting that the visitor has pressed a front button of the audio/video recording and communication device 500 (for example, when the audio/video recording and communication device 500 is a doorbell).

In response to the detection of the visitor, the audio/video recording and communication device 500 sends an alert to the user's client device 514 (FIG. 5) via the user's network 510 and the network 512. The audio/video recording and communication device 500 also sends streaming video, and may also send streaming audio, to the user's client device 514. If the user answers the alert, two-way audio communication may then occur between the visitor and the user through the audio/video recording and communication device 500 and the user's client device 514. The user may view the visitor throughout the duration of the call, but the visitor cannot see the user (unless the audio/video recording and communication device 500 includes a display, which it may in certain embodiments).

The video images captured by the camera 502 of the audio/video recording and communication device 500 (and the audio captured by the microphone 504) may be uploaded to the cloud and recorded on the remote storage device 516 (FIG. 5). In some embodiments, the video and/or audio may be recorded on the remote storage device 516 even if the user chooses to ignore the alert sent to the user's client device 514.

With further reference to FIG. 5, the system may further include a backend API 520 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 520 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 520 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 6:
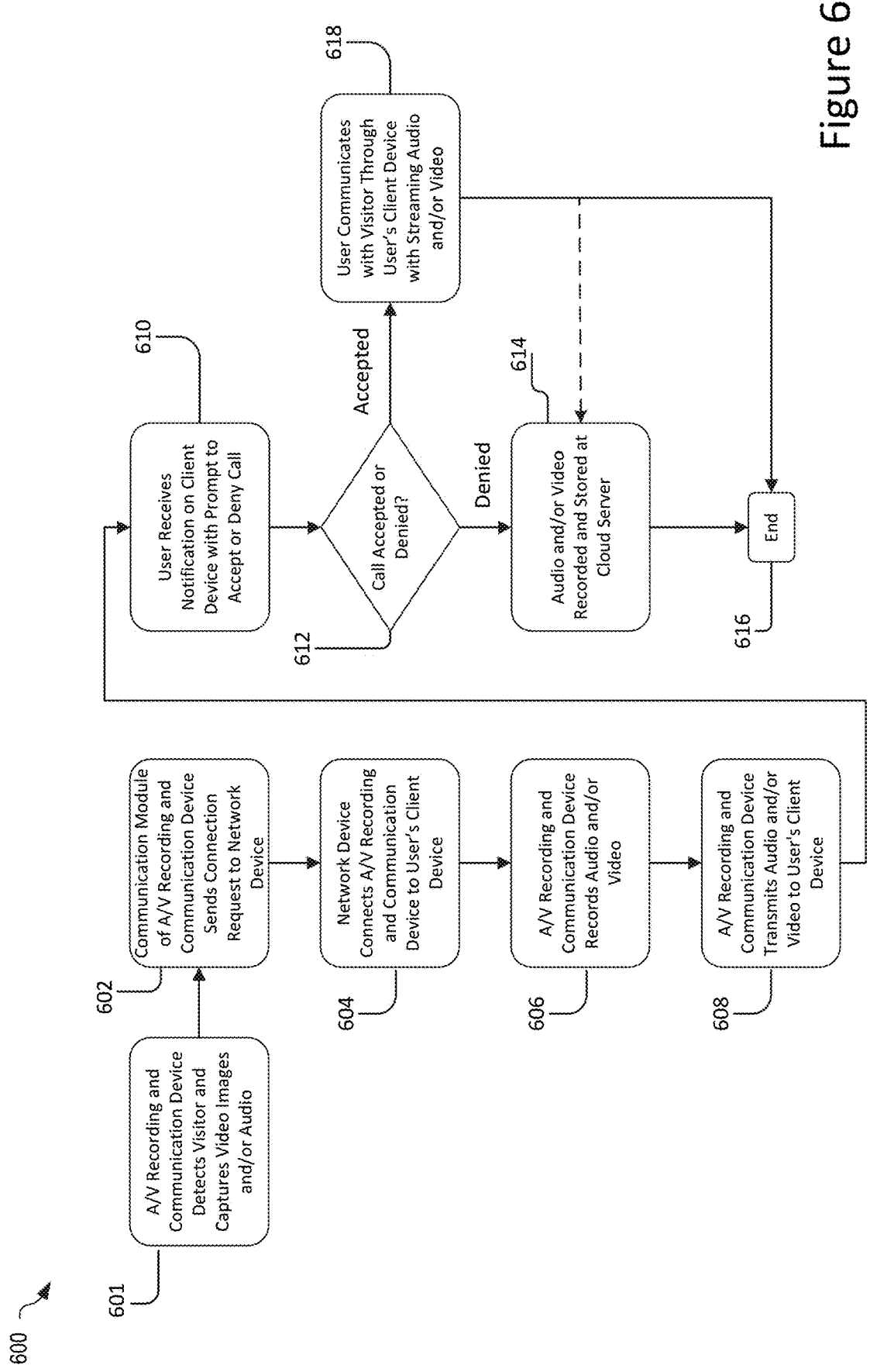
FIG. 6 is a flowchart illustrating a process for streaming and storing audio/video content from the device of FIG. 5, according to an embodiment.

FIG. 6 is a flowchart illustrating a process 600 for streaming and storing audio/video content from the audio/video recording and communication device 500, in an embodiment. At block 601, the audio/video recording and communication device 500 detects the visitor's presence and captures video images within a field of view of the camera 502. The audio/video recording and communication device 500 may also capture audio through the microphone 504. As described above, the audio/video recording and communication device 500 may detect the visitor's presence by detecting motion using the camera 502 and/or a motion sensor, and/or by detecting that the visitor has pressed a front button of the audio/video recording and communication device 500 (for example, when the audio/video recording and communication device 500 is a doorbell). Also as described above, the video recording/capture may begin when the visitor is detected, or may begin earlier, as described below.

At block 602, a communication module of the audio/video recording and communication device 500 sends a connection request, via the user's network 510 and the network 512, to a device in the network 512. For example, the network device to which the request is sent may be a server such as the server 518. The server 518 may include a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 520, which is described above.

In response to the request, at block 604 the network device may connect the audio/video recording and communication device 500 to the user's client device 514 through the user's network 510 and the network 512. At block 606, the audio/video recording and communication device 500 may record available audio and/or video data using the camera 502, the microphone 504, and/or any other device/sensor available. At block 608, the audio and/or video data is transmitted (streamed) from the audio/video recording and communication device 500 to the user's client device 514 via the user's network 510 and the network 512. At block 610, the user may receive a notification on the user's client device 514 with a prompt to either accept or deny the call.

At block 612, the process 600 determines whether the user has accepted or denied the call. If the user denies the notification, then the process 600 advances to block 614, where the audio and/or video data is recorded and stored at a cloud server. The session then ends at block 616 and the connection between the audio/video recording and communication device 500 and the user's client device 514 is terminated. If, however, the user accepts the notification, the process 600 proceeds with block 618 where the user communicates with the visitor through the user's client device 514 while audio and/or video data captured by the camera 502, the microphone 504, and/or other devices/sensors, is streamed to the user's client device 514. At the end of the call, the user may terminate the connection between the user's client device 514 and the audio/video recording and communication device 500 and the session ends at block 616. In some embodiments, the audio and/or video data may be recorded and stored at a cloud server (block 614) even if the user accepts the notification and communicates with the visitor through the user's client device 514.

Figure 7:
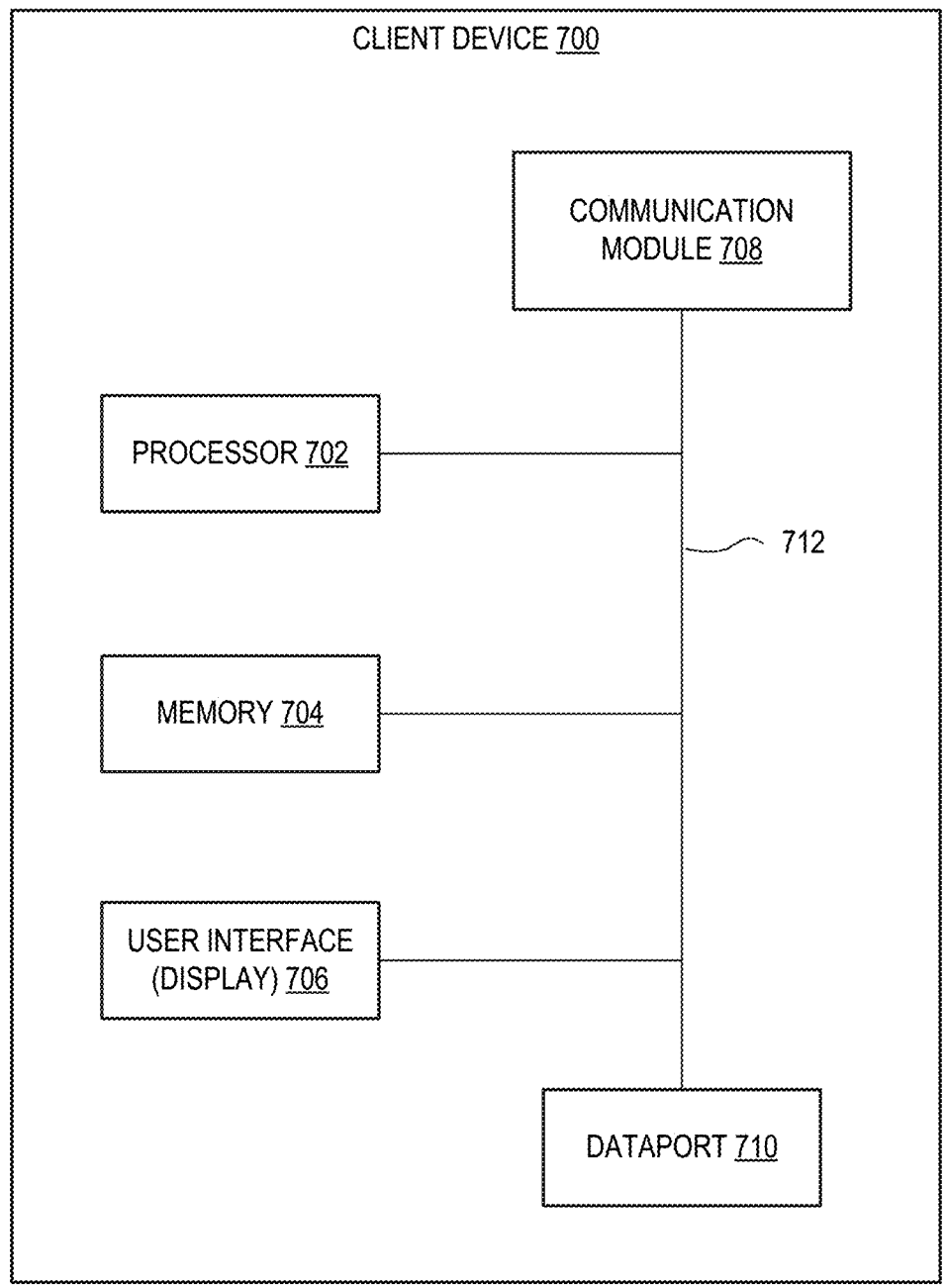
FIG. 7 is a functional block diagram of a client device, on which certain embodiments may be implemented, according to various aspects of present disclosure.

FIG. 7 is a functional block diagram of a client device 700 on which the present embodiments may be implemented according to various aspects of the present disclosure. The user's client device 514 described with reference to FIG. 5 may include some or all of the components and/or functionality of the client device 700. The client device 700 may be, for example, a smartphone.

The client device 700 includes a processor 702, a memory 704, a user interface 706, a communication module 708, and a dataport 710. These components are communicatively coupled together by an interconnect bus 712. The processor 702 may include any processor used in smartphones and/or portable computing devices, such as an ARM processor (a processor based on the RISC (reduced instruction set computer) architecture developed by Advanced RISC Machines (ARM).). In certain embodiments, the processor 702 includes one or more other processors, such as one or more microprocessors, and/or one or more supplementary co-processors, such as math co-processors.

The memory 704 may include both operating memory, such as random access memory (RAM), as well as data storage, such as read-only memory (ROM), hard drives, flash memory, or any other suitable memory/storage element. The memory 704 may include removable memory elements, such as a CompactFlash card, a MultiMediaCard (MMC), and/or a Secure Digital (SD) card. In certain embodiments, the memory 704 includes a combination of magnetic, optical, and/or semiconductor memory, and may include, for example, RAM, ROM, flash drive, and/or a hard disk or drive. The processor 702 and the memory 704 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 702 may be connected to the memory 704 via the dataport 710.

The user interface 706 may include any user interface or presentation elements suitable for a smartphone and/or a portable computing device, such as a keypad, a display screen, a touchscreen, a microphone, and a speaker. The communication module 708 is configured to handle communication links between the client device 700 and other, external devices or receivers, and to route incoming/outgoing data appropriately. For example, inbound data from the dataport 710 may be routed through the communication module 708 before being directed to the processor 702, and outbound data from the processor 702 may be routed through the communication module 708 before being directed to the dataport 710. The communication module 708 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 710 may be any type of connector used for physically interfacing with a smartphone and/or a portable computing device, such as a mini-USB port or an IPHONE®/IPOD® 30-pin connector or LIGHTNING® connector. In other embodiments, the dataport 710 may include multiple communication channels for simultaneous communication with, for example, other processors, servers, and/or client terminals.

The memory 704 may store instructions for communicating with other systems, such as a computer. The memory 704 may store, for example, a program (e.g., computer program code) adapted to direct the processor 702 in accordance with the present embodiments. The instructions also may include program elements, such as an operating system. While execution of sequences of instructions in the program causes the processor 702 to perform the process steps described herein, hard-wired circuitry may be used in place of, or in combination with, software/firmware instructions for implementation of the processes of the present embodiments. Thus, the present embodiments are not limited to any specific combination of hardware and software.

System/Device

Figure 8:
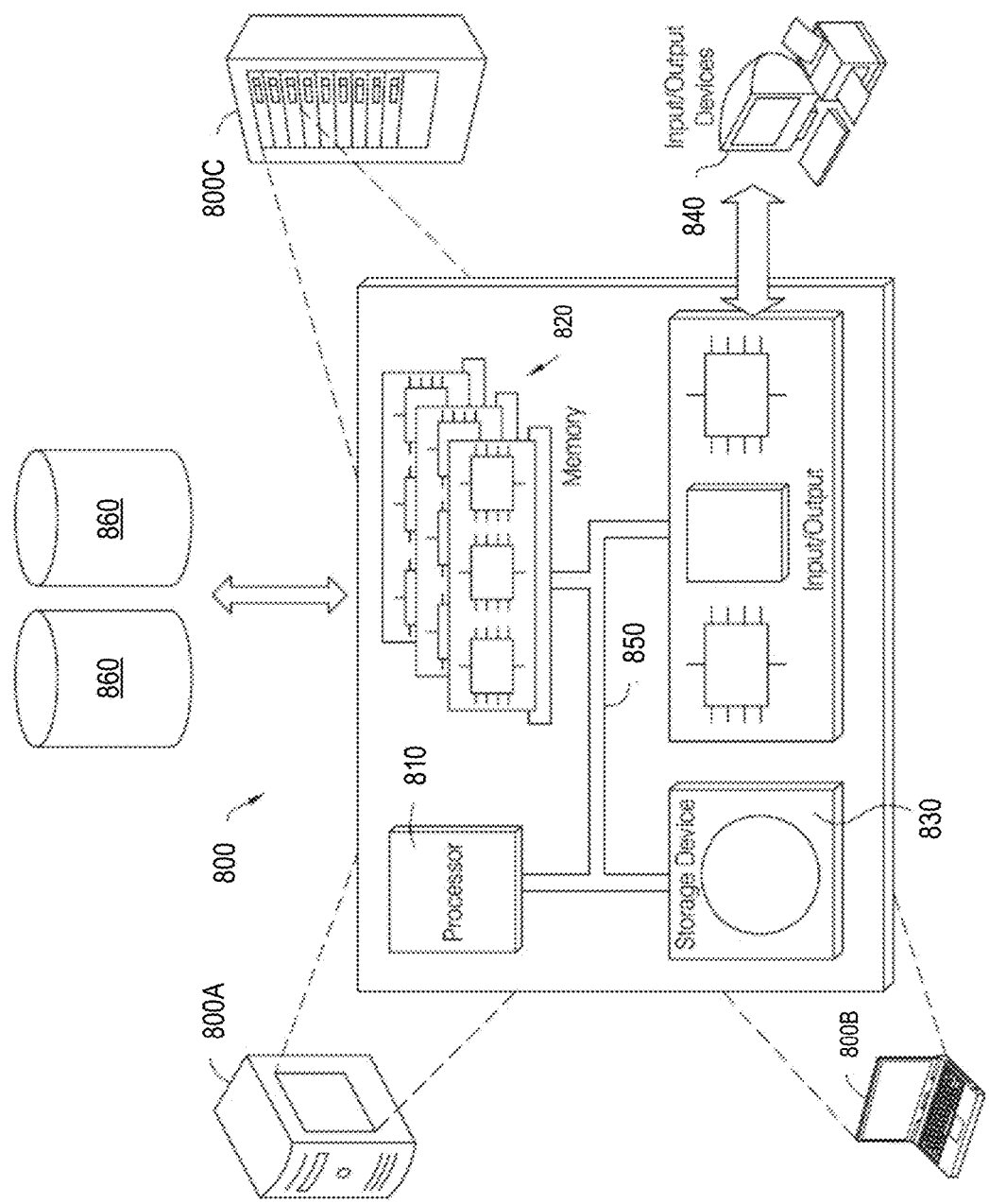
FIG. 8 is a functional block diagram of a system on which certain embodiments may be implemented, according to various aspects of present disclosure.

FIG. 8 is a functional block diagram of a system 800 on which the certain embodiments may be implemented according to various aspects of the present disclosure. For example, the system 800 may represent any one or more of the network-connected device 102, the security device 130, and the client device 140 of FIGS. 1 and 2, and the security device 402 of FIG. 4. The computer system 800 may be embodied in at least one of a personal computer (also referred to as a desktop computer) 800A, a portable computer (also referred to as a laptop or notebook computer) 800B, and/or a server 800C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers.

The term server may be construed broadly to include any computerized process that shares a resource to one or more client processes.

The computer system 800 may execute at least some of the operations described above. The computer system 800 may include at least one processor 810, a memory 820, at least one storage device 830, and input/output (I/O) devices 840. Some or all of the components 810, 820, 830, 840 may be interconnected via a system bus 850. The processor 810 may be single- or multi-threaded and may have one or more cores. The processor 810 may execute instructions, such as those stored in the memory 820 and/or in the storage device 830. Information may be received and output using one or more of the I/O devices 840.

The memory 820 may store information, and may be a computer-readable medium, such as volatile or non-volatile memory. The storage device(s) 830 may provide storage for the computer system 800, and may be a computer-readable medium. In various embodiments, the storage device(s) 830 may be one or more of a flash memory device, a hard disk device, an optical disk device, a tape device, or any other type of storage device.

The I/O devices 840 may provide input/output operations for the computer system 800. The I/O devices 840 may include a keyboard, a pointing device, and/or a microphone. The I/O devices 840 may further include a display unit for displaying graphical user interfaces, a speaker, and/or a printer. External data may be stored in one or more accessible external databases 860.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

EXAMPLE EMBODIMENTS

Figure 9:
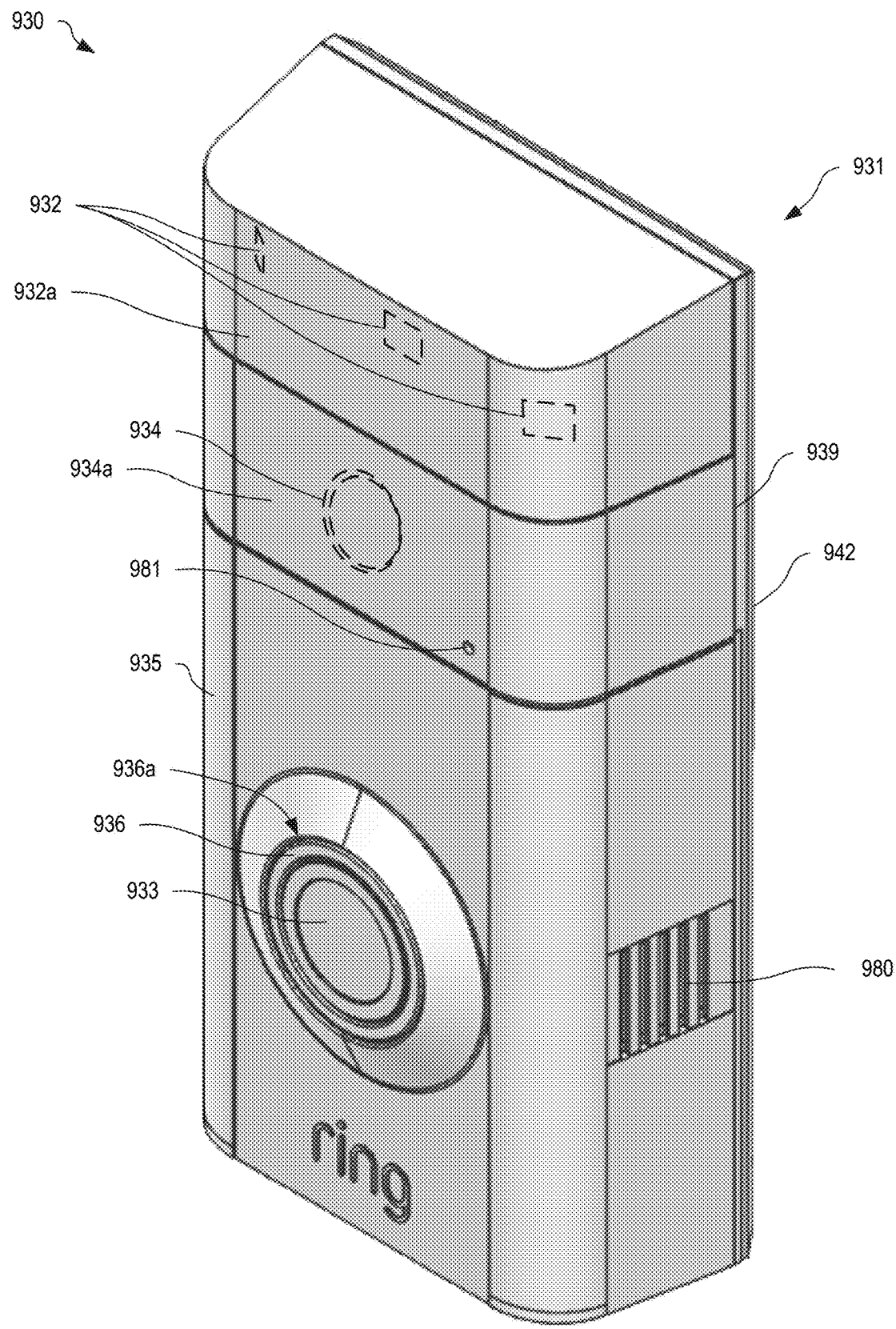
FIG. 9 is a front perspective view of the device of FIG. 5 implemented as a doorbell, in an embodiment.

FIG. 9 is a front perspective view of a doorbell 930 that represents one example implementation of the security device 500 of FIG. 5, hereafter referred to as device 930. The device 930 has a housing 931 that includes a backplate 939, a faceplate 935 with a button 933, an optically-transparent lens 934a positioned in front of a camera 934, and an infrared-transparent lens 932a positioned in front of at least one motion sensor 932. The housing 931 may be further configured with an aperture 981 to allow sound to enter the housing 931 for detection by a microphone. The device 930 may also include a mounting bracket 942 that couples with the backplate 939 to facilitate mounting of the device 930 on a flat surface, such as the exterior of a building, such as a home or office. For example, the mounting bracket 942 may be selected for mounting to surfaces of various composition, including, without limitation, wood, concrete, stucco, brick, vinyl siding, aluminum siding, etc., with any suitable fasteners, such as screws, or interference connections, adhesives, etc. The device 930 may couple to the mounting bracket 942 using any suitable fasteners, such as screws, or interference connections, mating hooks and apertures, adhesives, etc. The backplate 939 may include screw terminals configured to receive electrical wires adjacent a mounting surface of the device 930. The device 930 may receive electrical power through the screw terminals and/or the device 930 may control electrical connectivity of the screw terminals to cause a conventional doorbell to sound if so connected to the wires.

The faceplate 935 may extend from the bottom of the device 930 up to just below the camera 934. The faceplate 935 may be formed of any suitable material, including, without limitation, metals, such as brushed aluminum or stainless steel, metal alloys, and plastics, and any combination thereof. The faceplate 935 protects the internal contents of the device 930 and serves as an exterior front surface of the device 930. The faceplate 935 may include an aperture 936a with a flexible translucent membrane 936 for movably holding the button 933. The faceplate 935 is also formed with at least one speaker grille 980 to allow sound generated within the housing 931 to exit. The button 933 and the flexible translucent membrane 936 may have various profiles that may or may not match the profile of the faceplate 935. The flexible translucent membrane 936 may comprise any suitable material, including, without limitation, a transparent silicone, plastic, or rubber, that is configured for allowing light produced within the device 930 to pass through and is sufficiently flexible to allow the button 933 to be pressed. The light may be produced by one or more light-emitting components, such as light-emitting diodes (LEDs), contained within the device 930, as further described below. The button 933 and/or the flexible translucent membrane 936 contacts a switch cover located within the device 930 when the button 933 is pressed by a visitor. When pressed, the button 933 may trigger one or more functions of the device 930, as further described below.

The motion sensor 932 may be, for example, one or more passive infrared (PIR) sensors that detect motion using the infrared wavelength, but may be any type of sensor configured for detecting and communicating the presence of motion and/or a heat source within their field of view. The motion sensor 932 may be configured to detect motion using any methodology, including but not limited to methodologies that do not rely on detecting the presence of a heat source within a field of view, without departing from the scope of the present embodiments. In certain embodiments, the infrared-transparent lens 932a may be a Fresnel lens patterned to focus incoming light onto the at least one motion sensor 932 located within the device 930. The infrared transparent lens 932a may be substantially coplanar with a front surface of the housing 931. In alternative embodiments, the infrared-transparent lens 932a may be recessed within the housing 931 or may protrude outward from the housing 931. The infrared-transparent lens 932a may extend and curl partially around the side of the device 930 without departing from the scope of the present embodiments. The at least one motion sensor 932 is configured to sense a presence and/or motion of an object in front of the device 930. In certain embodiments, the optically-transparent lens 934a may be configured for focusing light into the camera 934 so that clear images may be taken. The camera 934 is configured for capturing video data when activated.

Floodlight Embodiment

Figure 10:
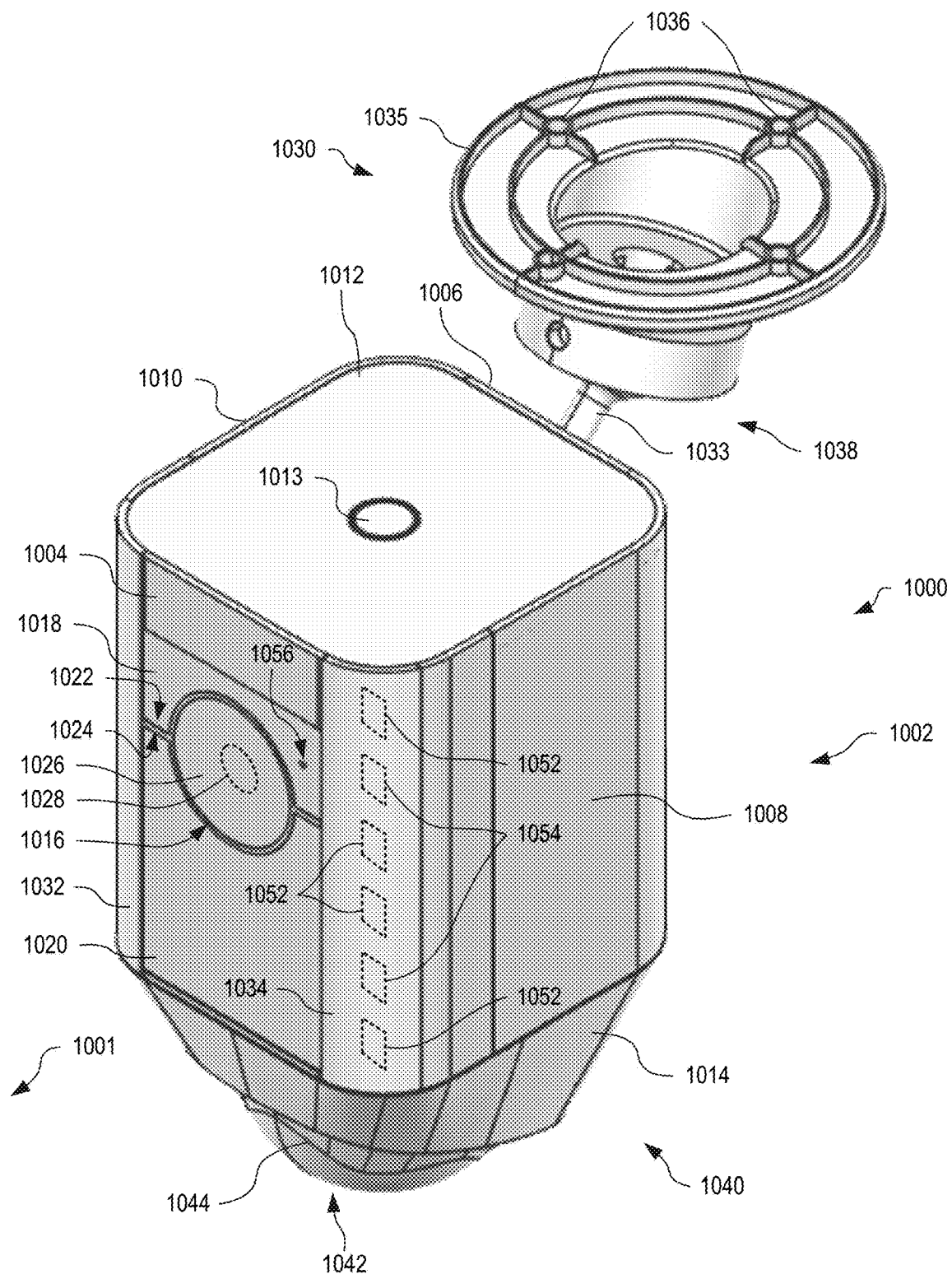
FIG. 10 is a front perspective view of the device of FIG. 5 implemented as a security/floodlight controlling device, in an embodiment, in combination with mounting hardware.

FIG. 10 is a front perspective view of a security device 1000, that represents one example implementation of the security device 500 of FIG. 5.

The security device 1000 is configured with a housing 1002 for containing and protecting the interior components of the security device 1000. The housing 1002 includes a front wall 1004, a rear wall 1006, opposing sidewalls 1008 (right), 1010 (left), an upper wall 1012, and a tapered lower portion 1014. The front wall 1004 forms a central opening 1016 that receives an upper shield 1018 and a lower grille 1020. In the illustrated embodiment, front surfaces of the upper shield 1018 and the lower grille 1020 are substantially flush with a front surface of the front wall 1004, but in alternative embodiments, these surfaces may not be flush with one another. The upper shield 1018 is substantially rectangular with a semicircular indentation along its lower edge 1022. The lower grille 1020 is substantially rectangular, and includes a semicircular indentation along its upper edge 1024. Together, the semicircular indentations in the upper shield 1018 and the lower grille 1020 form a circular opening that accommodates a cover 1026. The upper shield 1018, the lower grille 1020, and the cover 1026 are described in further detail below.

A camera 1028 is positioned behind the cover 1026 with a field of view of a monitored area 1001 to the front of the security device 1000 through the circular opening formed by the upper shield 1018 and the lower grille 1020. The cover 1026 is preferably transparent or translucent so that it does not interfere with the field of view of the camera 1028. For example, in certain embodiments the cover 1026 may comprise colorless glass or plastic.

The security device 1000 has a plurality of visible light emitting elements 1052 and infrared light emitting elements 1054 that are positioned behind right and left front corner shields 1032, 1034. For clarity of illustration, the visible light emitting elements 1052 and the infrared light emitting elements 1054 are shown only behind right corner shield 1034; the visible light emitting elements 1052 and the infrared light emitting elements 1054 are similarly positioned behind the left corner shield 1032. The corner shields 1032, 1034 may be formed of a material that is transparent to light within both the visible spectrum and the infrared spectrum. In certain embodiments, the corner shields 1032, 1034 are formed of a clear plastic (e.g., polycarbonate) or glass. The corner shields 1032, 1034, therefore, do not significantly interfere with transmission of light from the visible light emitting elements 1052 and the infrared light emitting elements 1054 into the monitored area 1001. The infrared light emitting elements 1054, in conjunction with operation of the camera 1028, facilitates night vision functionality of the security device 1000.

An input device 1013 is positioned on the upper wall 1012 of the housing 1002 such that it is accessible by the user. The input device 1013 may be, for example, a button connected to an electrical switch that provides an input to a processor of security device 1000.

The security device 1000 includes at least two microphones. The first microphone is positioned at the front of the security device 1000 and is aligned with a first microphone aperture 1056 within the upper shield 1018. The second microphone is positioned at the left side of the security device 1000 and is aligned with a second microphone aperture in the left sidewall 1010 of the housing 1002.

The tapered lower portion 1014 includes an opening to receive the motion sensor cover 1044, which is convexly shaped to cover and close the lower end opening of the tapered lower portion 1014. The motion sensor cover 1044 may include a Fresnel lens 1042 that is configured to focus and concentrate incoming infrared light onto a motion sensor (e.g., PIR sensors, now shown) located within the tapered lower portion 1014, thereby enhancing the effectiveness and/or sensitivity of the motion sensor. In alternative embodiments, the motion sensor cover 1044 may not include a Fresnel lens.

The motion sensor cover 1044 and the tapered lower portion 1014 couple with a plate to form a battery access door 1040 within the housing 1002 that provides access to removable battery casings configured within housing 1002. This configuration is well suited to a typical use case for the security device 1000, since floodlights are typically located above the head level of a person of average height. A person (or other object) moving at ground level within the monitored area 1001 is thus likely to be well within the field of view of the motion sensor.

The security device 1000 configured with coupling hardware 1030 that may be used to attach the security device 1000 to a supporting structure (not shown). For example, the coupling hardware 1030 may be used to secure the security device 1000 to a wall, a ceiling, a frame, a post, a gate, and so on. In the illustrated embodiment, the coupling hardware 1030 has a first connecting member 1033 secured to the rear wall 1006 of the housing 1002 and a second connecting member 1035 configured for securing to the supporting structure. For example, the second connecting member 1035 may include one or more apertures 1036 that allow the second connecting member 1035 to be screwed or nailed to the supporting structure. The first and second connecting members 1033, 1035 meet at a ball-and-socket joint 1038 that allows the first and second connecting members 1033, 1035 to articulate with respect to one another such that the security device 1000 may be oriented as desired. The ball-and-socket joint 1038 is, however, just one non-limiting example. In alternative embodiments, other types of joints may be provided between the first and second connecting members 1033, 1035, including non-articulating joints. In further alternative embodiments, the coupling hardware 1030 may comprise a single unitary member, rather than the first and second connecting members 1033, 1035.

In certain embodiments, the security device 1000 is configured to control an external illumination source that is capable of being reoriented, the external floodlights may work in conjunction with the integral illumination source (e.g., the visible light emitting elements 1052 and the infrared light emitting elements 1054) to illuminate a broader area around the security device 1000, thereby providing greater security and a larger area for video surveillance and recording. For example, the user may orient the security device 1000 such that the integral illumination source points straight ahead and reorient the external illumination source to point to the sides of the area illuminated by the integral illumination source, thereby illuminating a broader area.

Figure 11:
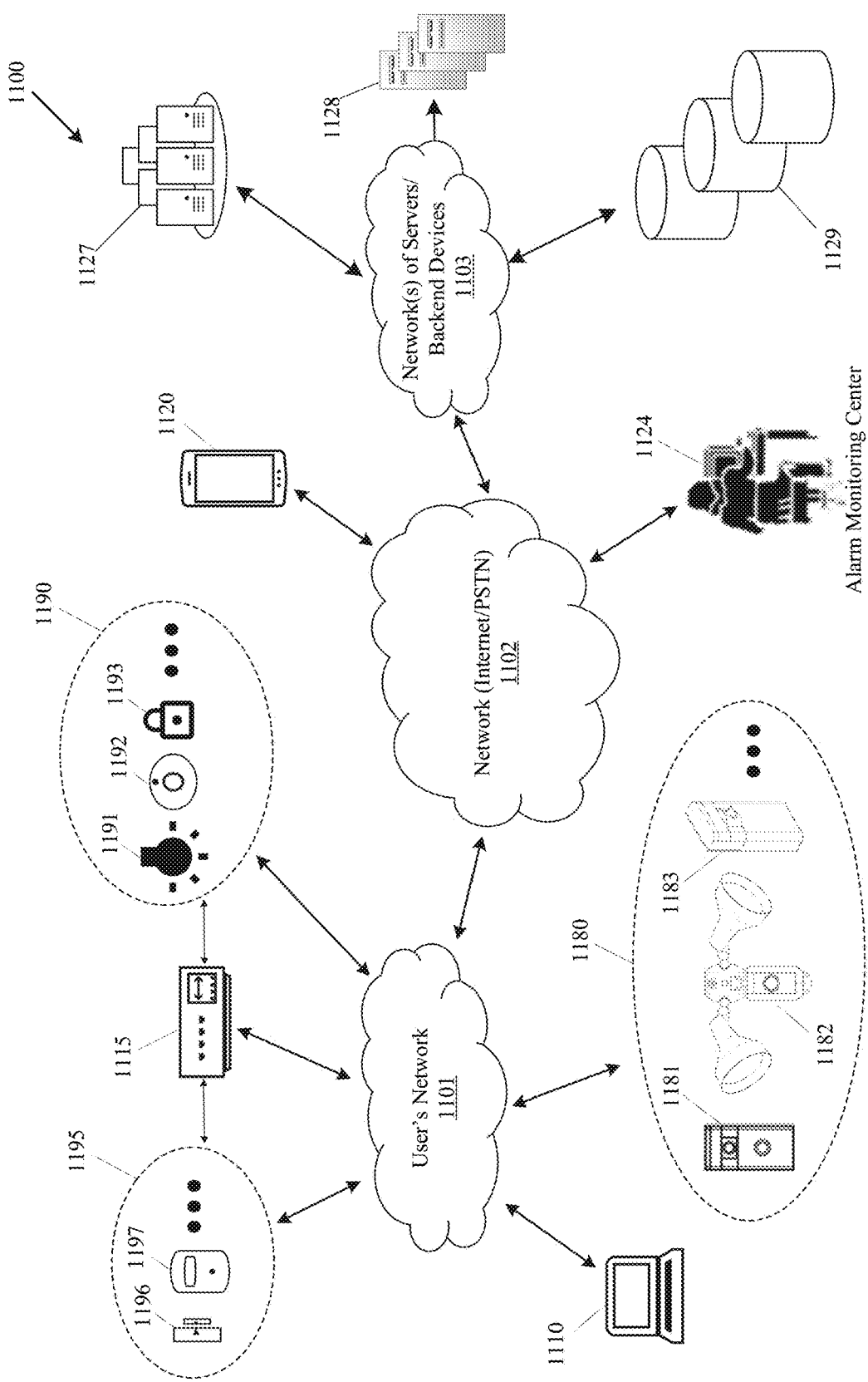
FIG. 11 is a functional block diagram illustrating a system including a hub device with which certain embodiments may be implemented, according to various aspects of present disclosure.

FIG. 11 is a functional block diagram illustrating a system including a hub device with which certain embodiments may be implemented, according to various aspects of present disclosure. A system 1100 for communication between several user devices is connected to a user's network (e.g., a home network) 1101, and remote servers and other remote devices connected to other networks 1102, 1103. Specifically, the user's network 1101, in some of the present embodiments, may include a hub device 1115, security/alarm devices 1195 and smart home devices 1190 associated with the hub device 1115, client device(s) 1110, and audio/video (A/V) recording and communication devices 1180. An alarm monitoring center 1124 and a client device 1120, among other entities and devices, may be connected to the public network 1102. Additionally, the backend network 1103 may include several backend devices, such as one or more remote storage devices 1129, one or more servers 1128, and one or more backend application programming interfaces (APIs) 1127.

The user's network 1101 may be, for example, a wired and/or wireless network (e.g., Ethernet network, Wi-Fi network, ZigBee network, Z-Wave network, etc.). Alternatively, or in addition, the user's network 1101 may comprise various networks such as a cellular/mobile network, a local network, a public network, a low-bandwidth network, and/or any other appropriate network. If the user's network 1101 is wireless, or includes a wireless component, the network 1101 may be a Wi-Fi network compatible with the IEEE 802.11 standard and/or other wireless communication standard(s).

As shown in FIG. 11, the user's network 1101 is connected to another network 1102, which may comprise, for example, the Internet and/or a public switched telephone network (PSTN). As described below, the security devices 1195, the smart home devices 1190, and the A/V recording and communication devices 1180 may communicate with the client devices 1110, 1120 via the network 1101 and the network 1102 (Internet/PSTN). In various embodiments, any or all of the hub device 1115, the security devices 1195, the smart home devices 1190, and the A/V recording and communication devices 1180 may communicate with the client devices 1110, 1120 directly (e.g., using one or more wireless technologies and/or protocols, such as Bluetooth, Bluetooth LE, ZigBee, Z-Wave, etc.). The network 1102 may be any wireless network or any wired network, or a combination thereof, configured to operatively couple the above-mentioned modules, devices, and systems as shown in FIG. 11. For example, the network 1102 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 11, the hub device 1115, in some of the present embodiments, may comprise any device that facilitates communication with and control of the alarm devices 1195 and the smart devices 1190. In some aspects of the present embodiments, the hub device 1115 may also facilitate communication with and control of the A/V recording and communication devices 1180. The hub device 1115 may be powered by a connection to an external power (e.g., AC mains). Additionally, the hub device 1115 may include an internal backup battery to which the hub device 1115 switches when the external power is disconnected.

The security devices 1195 and the smart devices 1190, in some of the present embodiments, may communicate with the hub device 1115 directly (e.g., using one or more wireless technologies and/or protocols, such as Bluetooth, Bluetooth LE, ZigBee, Z-Wave, etc.) and/or indirectly (e.g., via the user's network 1101). In some of the present embodiments, the A/V recording and communication devices 1180 may communicate with the hub device 1115 through one or more networks (e.g., the user's network 1101 and the network 1102). Although not shown in FIG. 11, in some embodiments, the hub device 1115 may communicate directly with the A/V recording and communication devices 1180 (e.g., via wired and/or wireless channels). The hub device 1115 may include any or all of the components and/or functionality of the network-connected device 102 described in detail above with reference to FIG. 1.

With continued reference to FIG. 11, the alarm devices 1195 may include, but are not limited to, monitoring sensors, such as contact sensors 1196 (e.g., door sensors, window sensors, etc.), motion sensors 1197, noise detectors (not shown), glass-break sensors (not shown), and/or other similar intrusion detection sensors. These sensors (or detectors) may be used for monitoring and/or detecting unauthorized entry into a property. As will be described in more detail below, when any of the sensors 1195 are tripped (or triggered), the sensor may immediately transmit an intrusion event signal to the hub device 1115 via a communication path (e.g., a wireless and/or wired channel).

The smart devices 1190 may include, but are not limited to, indoor/outdoor lighting systems (e.g., smart light emitting diodes (LEDs) 1191), temperature control systems (e.g., thermostats 1192), locking control systems for doors and/or windows (e.g., smart locks 1193), shade/blind control systems (not shown), or any other automation (or smart home) devices that can communicate with, and be controlled by, the hub device 1115.

In some of the present embodiments, the hub device 1115 may be a component of a home automation system installed at a property of a user who is associated with the client devices 1110,1120. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 1190 and the alarm devices 1195, when remotely monitored and controlled via the network (Internet/PSTN) 1102, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 1190 and the alarm devices 1195 may be controlled via a user interface in some of the present embodiments. The user interface may include any or all of a wall-mounted terminal, software installed on the client devices 1110, 1120 (e.g., a mobile application), a tablet computer or a web interface, and may communicate with Internet cloud services. In addition to communicating with, and/or controlling, the smart home devices 1190 and the alarm devices 1195, in various embodiments, the client devices 1110, 1120 may also be configured to be in network communication with, and/or controlling, the A/V recording and communication devices 1180 (e.g., via the networks 1101 and 1102). The client devices 110, 120 may comprise, for example, a mobile phone such as a smartphone, or a computing device such as a tablet computer, a laptop computer, a desktop computer, etc. The client devices 1110, 1120 may include any or all of the components and/or functionality of the client device 700 described above with reference to FIG. 7.

With further reference to FIG. 11, the system 1100 may also include one or more A/V recording and communication devices 1180 (e.g., installed at the same property where the alarm devices 1195 and smart home devices 1190 are installed). The A/V recording and communication devices 1180 may include, but are not limited to, video doorbells 1181, lighting systems with A/V recording and communication capabilities (e.g., floodlight cameras 1182, spotlight cameras (not shown), etc.), security cameras 1183, or any other similar devices. The structure and functionality of the A/V recording and communication devices 1180 are described above with reference to FIGS. 9 and 10. As described above, in some embodiments, the user may control the A/V recording and communication devices 1180 using either or both of the client devices 1110, 1120. Additionally, in some embodiments, the user may control the A/V recording and communication devices 1180 through the hub device 1115 (e.g., using either or both of the client devices 1110, 1120). In some embodiments, however, the client devices 1110, 1120 may not be associated with an A/V recording and communication device.

As described above, a user may control the smart home devices 1190, the alarm devices 1195, and/or the A/V recording and communication devices 1180, using one or more applications executing on a client device of the user (e.g., the client device 1120). For example, the user may turn on/off the lights 1191, may turn up/down the temperature using the thermostat 1192, may lock/unlock the doors and windows through the locks 1192, etc. The user may also arm/disarm one or more of the security/alarm devices 1195 (and one or more of the A/V recording and communication devices 1180) using the client devices 1110, 1120.

With further reference to FIG. 11, the system 1100 may also include one or more remote storage devices 1129 (may be referred to interchangeably as "cloud storage device(s)"), one or more servers 1128, and one or more backend application programming interfaces (APIs) 1127 that are connected to network 1103. The network 1103 may be similar in structure and/or function to the above-described user's network 1101. The hub 1115 (and in some embodiments the hub's associated security devices 1195 and smart devices 1190) and/or the AN recording and communication devices 1180 may communicate with, and be managed by, the remote servers 1128 and APIs 1127 through the networks 1101, 1102, and 1103. Examples of such communications are described below.

While FIG. 11 illustrates the storage devices 1129, the servers 1128, and the backend APIs 1127 as components of the network 1103 and separate from the network 1102, in some aspects of the present embodiments, one or more of the storage devices 1129, the servers 1128, and the backend APIs 1127 may be components of the network 1102. Additionally, in some embodiments, the storage devices 1129 may be separate from the backend servers 1128 or may be an integral component of the backend servers 1128. Any of the backend APIs 1127 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

Each of the backend APIs 1127 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the backend APIs 1127 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 11, the system 1100 may also include the security/alarm monitoring center 1124. In some embodiments, each time the hub 1115 receives an intrusion alert signal from one or more of the security/alarm devices 1195 (e.g., when one or more of the sensors 1196 and/or 1197 are triggered), the hub 1115 may send a security breach signal to the security/alarm monitoring center 1124. In addition to the hub 1115, the A/V recording and communication devices 1180 of some embodiments may also send a security breach signal to the security/alarm monitoring center 1124 when these devices determine that an emergency situation has occurred. For example, when one of the A/V recording and communication devices 1180 (e.g., the floodlight camera 1182) detects an unknown person and/or activity in an area about the location of the A/V recording and communication device, the device may send a security breach signal to the alarm monitoring center 1124.

The security/alarm monitoring center 1124 (e.g., an operator of the center) may, in turn, dispatch civil authorities to investigate the monitored premises and/or may send other types of notifications, including, but not limited to, text messages, such as SMS (Short Message Service) messages, MMS (Multimedia Messaging Service) messages, email messages, voice messages (either live or recorded), etc. to one or more client devices of a user, such as the client devices 1110, 1120. Typically, when the security/alarm monitoring center 1124 does not receive an acknowledgment from the user, or receive an acknowledgment in which the user informs the center of an emergency situation (e.g., the user is away from home), the monitoring center may contact an emergency call center (not shown in the communication system 1100).

The emergency call center may comprise a local 911 call center that serves a region in which the hub 1115 is located. The emergency call center may also be reached by the client devices 1110, 1120, and/or the backend devices 1127, 1128 directly (e.g., using a PSTN) or indirectly (e.g., through the networks 1101, 1102, and 1103).

In some alternative embodiments, the security monitoring center 1124 may not be a separate entity different from the backend servers 1128 (and/or the backend APIs 1127). For example, in some of the present embodiments, the backend servers 1128 may monitor the home security devices 1195 and/or the hub 1115 (and other security systems not shown in the figures) in addition to managing the hub 1115 and/or the AN recording and communication devices 1180.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The above section discusses detecting visitors and facial features of those visitors. While, in at least some embodiments discussed above, the phrase visitor or visitors indicates a person or persons, and comparison of a detected person is made to images of prior persons based on facial features of the person, other features besides facial features and other visitors besides persons may be analyzed. For example, instead of facial features, other body features (such as hair color, clothing types/colors, glasses, hats, height, approximated weight, size, etc.) may be analyzed. Further, pets may be analyzed. Further, vehicles may be analyzed based on features such as model/make/year/color, etc. Therefore, "visitors" includes not only people, but also other objects detected/captured by the security devices discussed above, such as vehicles, pets, other animals, etc.

In a first aspect, a method for determining whether a detected visitor is known or unknown at a first location, comprises: receiving an image of the detected visitor and annotation data defining a first capture time of the image; comparing the image of the detected visitor to a prior visitor model including a group of at least one image of a prior visitor to the first location, the group corresponding to a range of prior capture times, the prior capture times differing from the first capture time; and determining the detected visitor is unknown when the image of the detected visitor matches the image of the prior visitor captured at the prior capture time.

In certain embodiments of the first aspect, the image of the detected visitor includes a facial image of the detected visitor.

In certain embodiments of the first aspect, the method further comprises isolating a face of the detected visitor within the facial image.

In certain embodiments of the first aspect, the image of the prior visitor includes an isolated face of the prior visitor.

In certain embodiments of the first aspect, the method further comprises generating the prior visitor model by grouping images of prior visitors captured at the first location over a collection period.

In certain embodiments of the first aspect, the collection period has a collection period length selected from the group including one week, two weeks, three weeks, one month, two months, three months, and one year.

In certain embodiments of the first aspect, the collection period is a sliding window of time having the collection period length and ending at the present time, and images are removed from the prior visitor model that were not captured during the collection period.

In certain embodiments of the first aspect, the prior capture times differ from the first capture time if the first capture time falls outside the range defined by the prior capture time.

In certain embodiments of the first aspect, the method further comprises generating the prior visitor model by grouping each image of the prior visitor into at least one group according to time of capture range, the at least one group including at least one of daytime, nighttime, workdays, weekends, seasons, and holidays.

In a second aspect, a method for determining whether a detected visitor is known or unknown at a first location, comprises: receiving an image of the detected visitor at the first location; comparing the image of the detected visitor to a prior visitor model, the prior visitor model including a first count of the number of times the prior visitor has been detected at the first location, and a group of at least one image of a prior visitor at the second location, and a count of the number of times the prior visitor has been detected at the second location; and, determining the detected visitor as known when: the first count is below a first threshold, and, the second count is above a second threshold.

In certain embodiments of the second aspect, the first threshold is one.

In certain embodiments of the second aspect, the first threshold is greater than one.

In certain embodiments of the second aspect, the second threshold is greater than the first threshold.

In certain embodiments of the second aspect, the number of times the prior visitor has been detected at the second location is defined by the number of images in the group.

In certain embodiments of the second aspect, the number of times the prior visitor has been detected at the second location is defined by a number of images in an additional group of images of the prior visitor to the first location.

In certain embodiments of the second aspect, the image of the detected visitor includes a facial image of the detected visitor.

In certain embodiments of the second aspect, the method further comprises isolating a face of the detected visitor within the facial image.

In certain embodiments of the second aspect, the image of the prior visitor at the second location includes an isolated face of the prior visitor at the second location.

In certain embodiments of the second aspect, the method further comprises generating the prior visitor model by grouping images of prior visitors captured at the second location over a collection period.

In certain embodiments of the second aspect, the collection period has a collection period length selected from the group including one week, two weeks, three weeks, one month, two months, three months, and one year.

In certain embodiments of the second aspect, the collection period is a sliding window of time having the collection period length and ending at a present time, and images are removed from the prior visitor model that were not captured during the collection period.

Changes may be made in the above embodiments without departing from the scope of the present embodiments. The matter contained in the above description and/or shown in the accompanying drawings should be interpreted as illustrative and not in a limiting sense. The following claims are intended to cover all generic and specific features described herein, as well as all statements of the scope of the present embodiments, which, as a matter of language, might be said to fall therebetween.

What is claimed is:

1. A method for determining whether a detected visitor is unknown at a location, comprising:
   receiving, from a security device, (i) an image of the detected visitor at the location and (ii) capture time of the image;
   comparing the image of the detected visitor to a prior visitor model, the prior visitor model including previously captured images, the previously captured images including at least one image of a prior visitor to the location during a capture period; and
   determining the detected visitor is unknown when the image of the detected visitor matches the image of the prior visitor and the capture time is outside the capture period.

2. The method of claim 1, the image of the detected visitor being received in a video stream from the security device and including a representation of a face of the detected visitor.

3. The method of claim 2, further comprising isolating the representation of the face of the detected visitor within the video stream to generate the image of the detected visitor as a facial image.

4. The method of claim 3, the previously captured images representing only the face of the visitor.

5. The method of claim 1, further comprising:
   adding the image of the detected visitor to the previously captured images when the image of the detected visitor matches the at least one image of the prior visitor.

6. The method of claim 1, further comprising determining the detected visitor is known when the image of the detected visitor matches the at least one image of the prior visitor and the capture time is within the capture period.

7. The method of claim 6, further comprising generating a notification of the detected visitor when the visitor is unknown, and suppressing the notification of the detected visitor to a client device associated the security device when the visitor is known.

8. The method of claim 6, further comprising sending a notification to a client device associated with the security device when the detected visitor is unknown.

9. The method of claim 1, further comprising determining the visitor is unknown when the image of the detected visitor matches the at least one image of the prior visitor and a count of the at least one image depicting the prior visitor in the previously captured images is less than a regular visitor threshold.

10. The method of claim 9, the regular visitor threshold being a number of times the prior visitor has been previously detected.

11. The method of claim 9, further comprising generating a notification of the detected visitor when the visitor is unknown, and not sending the notification of the detected visitor to a client device associated the security device when the visitor is known.

12. The method of claim 1, further comprising determining the visitor is known when the image of the detected visitor matches the image of the prior visitor and the capture time is within the capture period, and a count of the at least one image of the prior visitor in the previously captured images is greater than a regular visitor threshold, the regular visitor threshold being a number of times the prior visitor has been previously detected.

13. The method of claim 12, further comprising generating a notification of the detected visitor when the visitor is unknown, and suppressing the notification of the detected visitor to a client device associated the security device when the visitor is known.

14. The method of claim 12, further comprising sending a notification to a client device associated with the security device when the detected visitor is unknown.

15. The method of claim 1, further comprising removing captured images from the prior visitor model captured outside of a collection period.

16. The method of claim 15, the collection period having a collection period length selected from the group including one week, two weeks, three weeks, one month, two months, three months, and one year.

17. The method of claim 15, the collection period being a sliding window of time having a collection period length and ending at a present time.

18. The method of claim 1, the capture period being selected from the group of capture periods including daytime, nighttime, workdays, weekends, seasons, and holidays.

19. A method for determining whether a detected visitor is unknown at a location, comprising:
  receiving, from a security device, an image of the detected visitor;
  comparing the image of the detected visitor to a prior visitor model, the prior visitor model including previously captured images, the previously captured images including at least one image of a prior visitor to the location captured during a capture period; and
  determining the visitor is unknown when a representation of a first face in the image of the detected visitor matches a representation of a second face in the image of the prior visitor and a count of the at least one image of the prior visitor in the previously captured images is less than a regular visitor threshold.

20. The method of claim 19, further comprising generating a notification of the detected visitor when the visitor is unknown, and suppressing the notification of the detected visitor to a client device associated the security device when the visitor is known.

21. The method of claim 19, further comprising sending a notification to a client device associated with the security device when the detected visitor is unknown.

* * * * *